United States Patent
Held

(10) Patent No.: US 8,297,679 B2
(45) Date of Patent: Oct. 30, 2012

(54) MECHANIZED OR MOTORED RETRACTABLE ENCLOSURE PANELS AND THEIR SUPPORT BRACKETS

(76) Inventor: Michael P Held, Orchard Park, NY (US)

( * ) Notice: Subject to any disclaimer, the term of this patent is extended or adjusted under 35 U.S.C. 154(b) by 0 days.

(21) Appl. No.: 13/176,986

(22) Filed: Jul. 6, 2011

(65) Prior Publication Data

US 2011/0260019 A1  Oct. 27, 2011

Related U.S. Application Data

(63) Continuation-in-part of application No. 12/604,080, filed on Oct. 22, 2009, now abandoned.

(60) Provisional application No. 61/107,658, filed on Oct. 22, 2008.

(51) Int. Cl.
*B60J 11/06* (2006.01)

(52) U.S. Cl. .......... 296/83; 296/141

(58) Field of Classification Search .......... 296/140, 296/141, 143, 77.1, 79, 80, 83
See application file for complete search history.

(56) References Cited

U.S. PATENT DOCUMENTS

| | | | | |
|---|---|---|---|---|
| 595,228 | A * | 12/1897 | West | 296/143 |
| 1,451,660 | A * | 4/1923 | Hyland | 296/143 |
| 3,958,826 | A * | 5/1976 | Upton | 296/77.1 |
| 5,921,609 | A * | 7/1999 | Mills et al. | 296/138 |
| 6,851,739 | B2 * | 2/2005 | Morley | 296/102 |
| 6,979,040 | B1 * | 12/2005 | Brewer, Jr. | 296/83 |

* cited by examiner

*Primary Examiner* — Dennis Pedder
(74) *Attorney, Agent, or Firm* — Patricia M. Costanzo

(57) ABSTRACT

Mechanized or motor activated retractable enclosure-panels and custom brackets for any style open-air-vehicle having roof structures, including cars and boats, is taught. Installation takes less than 20 minutes with no drilling required, in most cases. The system includes brackets to directly rotably support the panels. The brackets are bolted directly onto roof supports via preexisting roof-support bolt holes, or onto the track bar that comes with some specialty roofs. A mechanized and/or motorized back-panel completely protects passengers and cargo from the elements using vent flaps for complete corner coverage. Rotational mechanized activators include pull-chains, roller pulleys, and spring-mechanized activators that can be motorized. For vehicles not fitted with a roof structure, a support frame for supporting retractable, mechanized and/or motorized panels is designed. Only a single protective panel is required per vehicle side regardless of vehicle size. Only four brackets are required to support three panels.

18 Claims, 25 Drawing Sheets

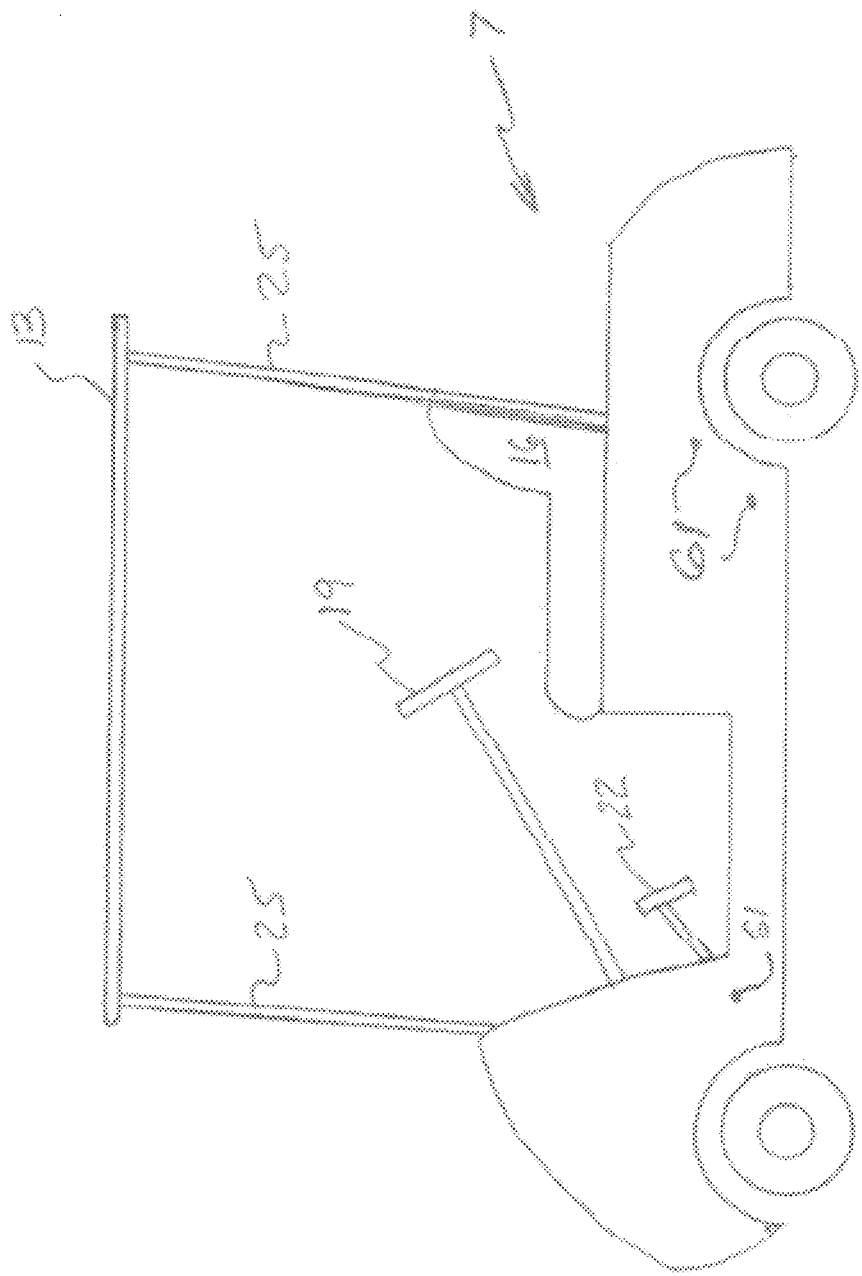

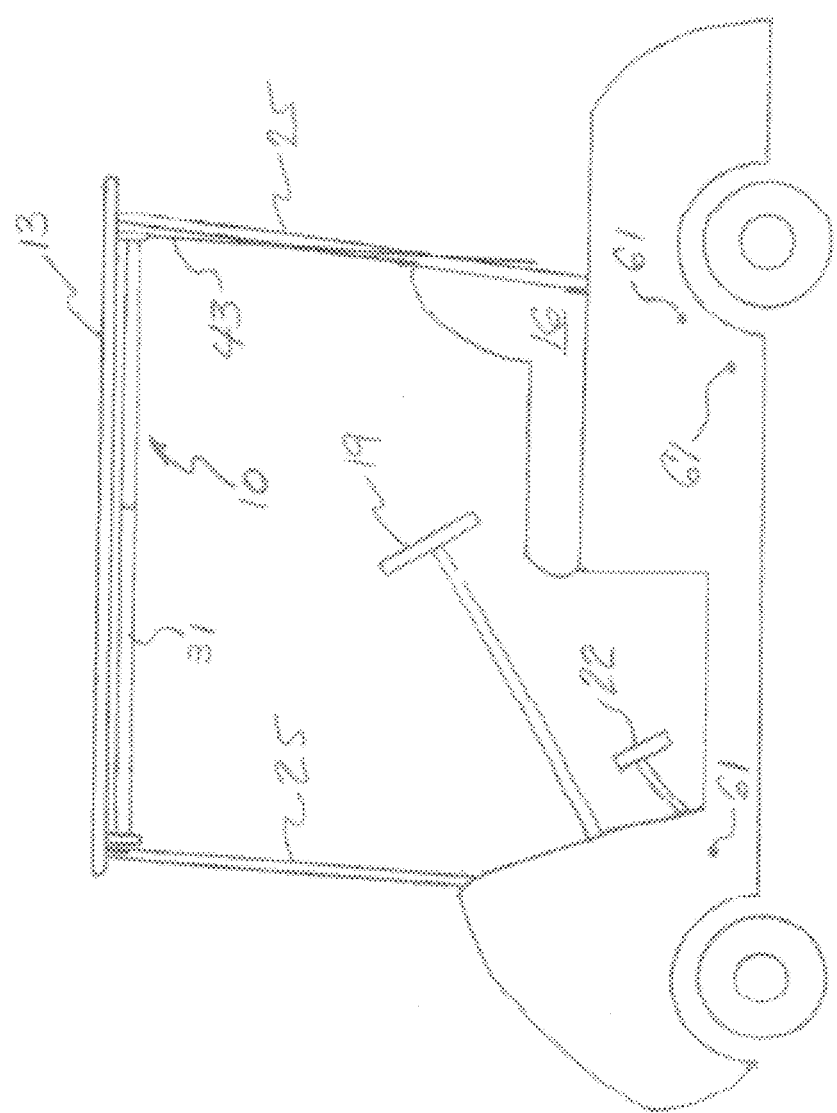

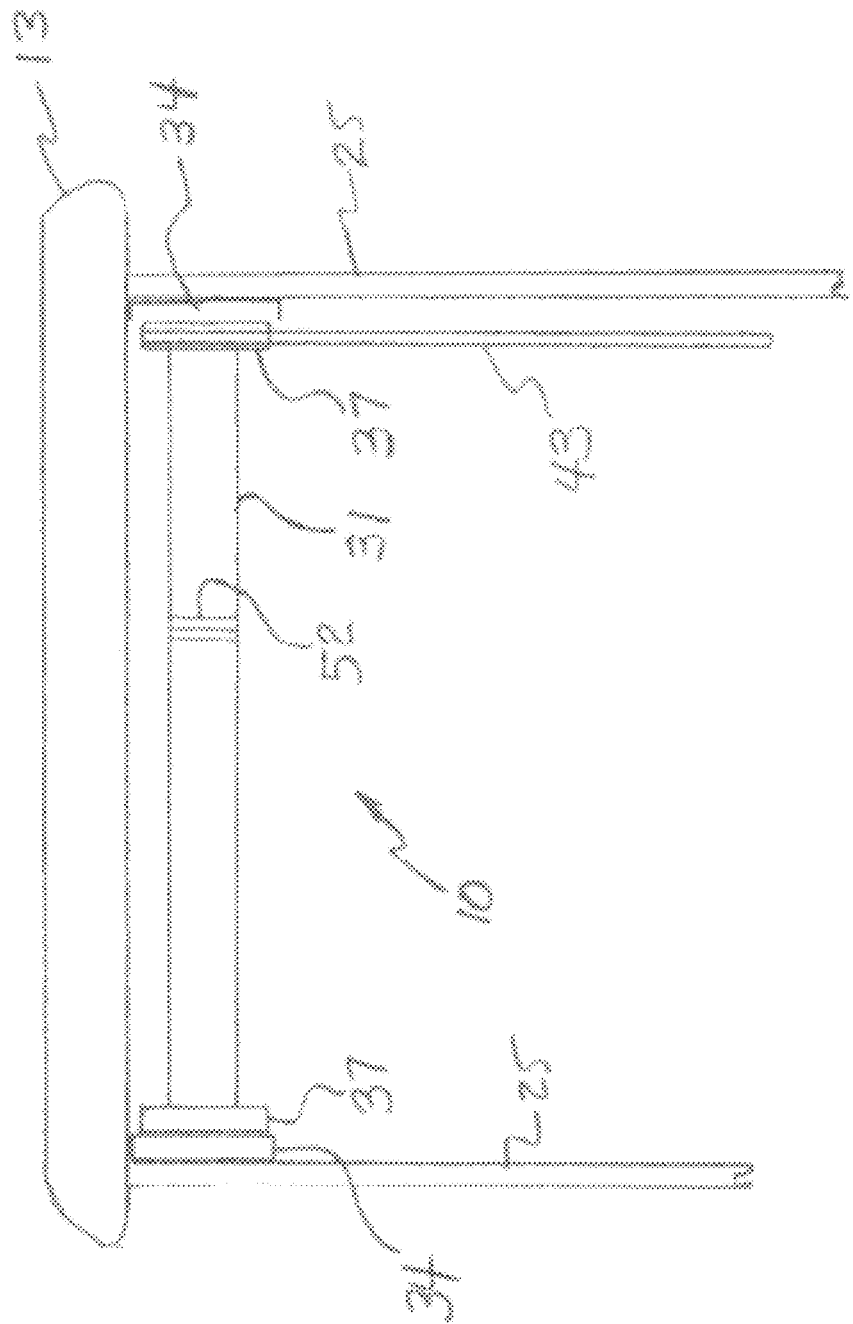

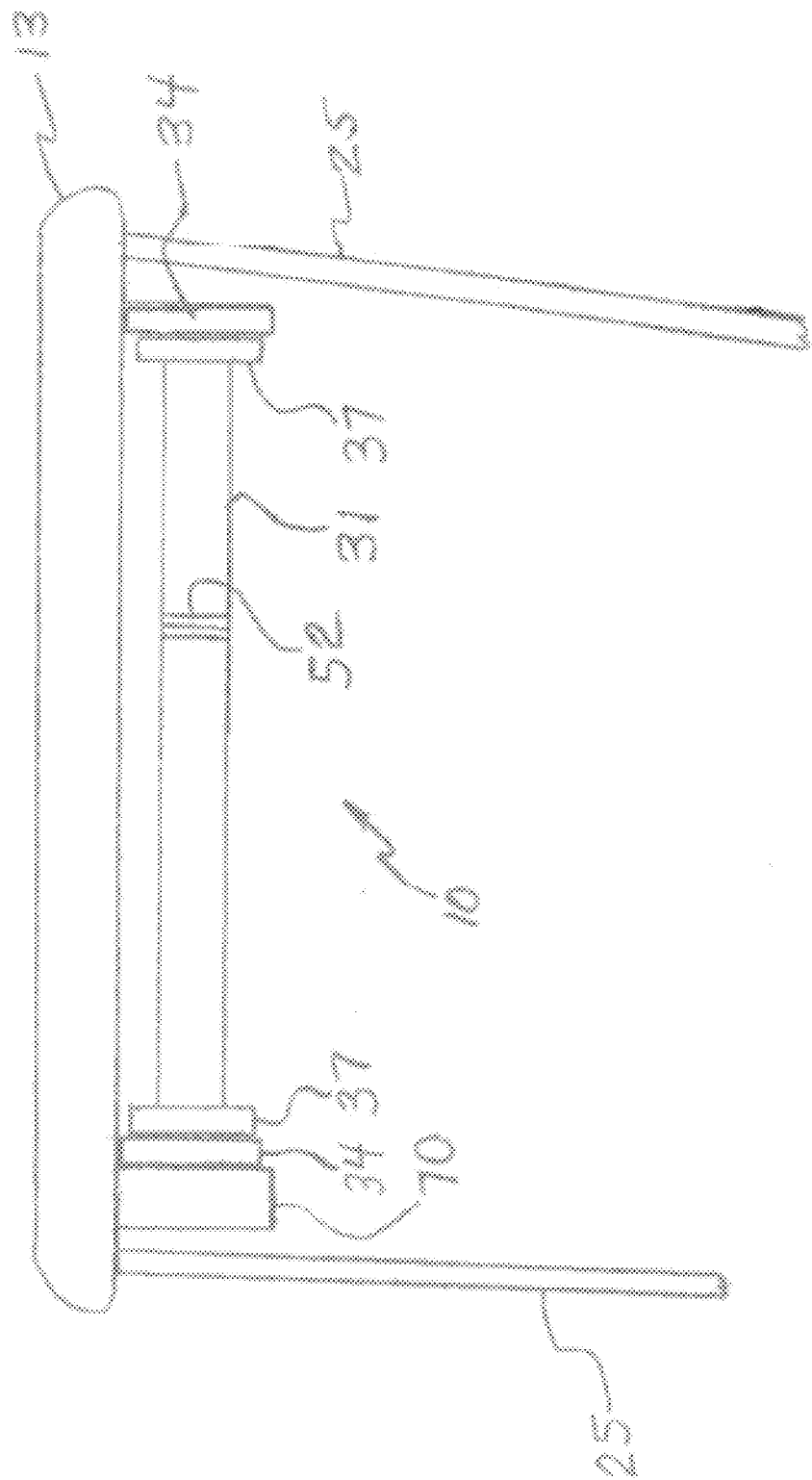

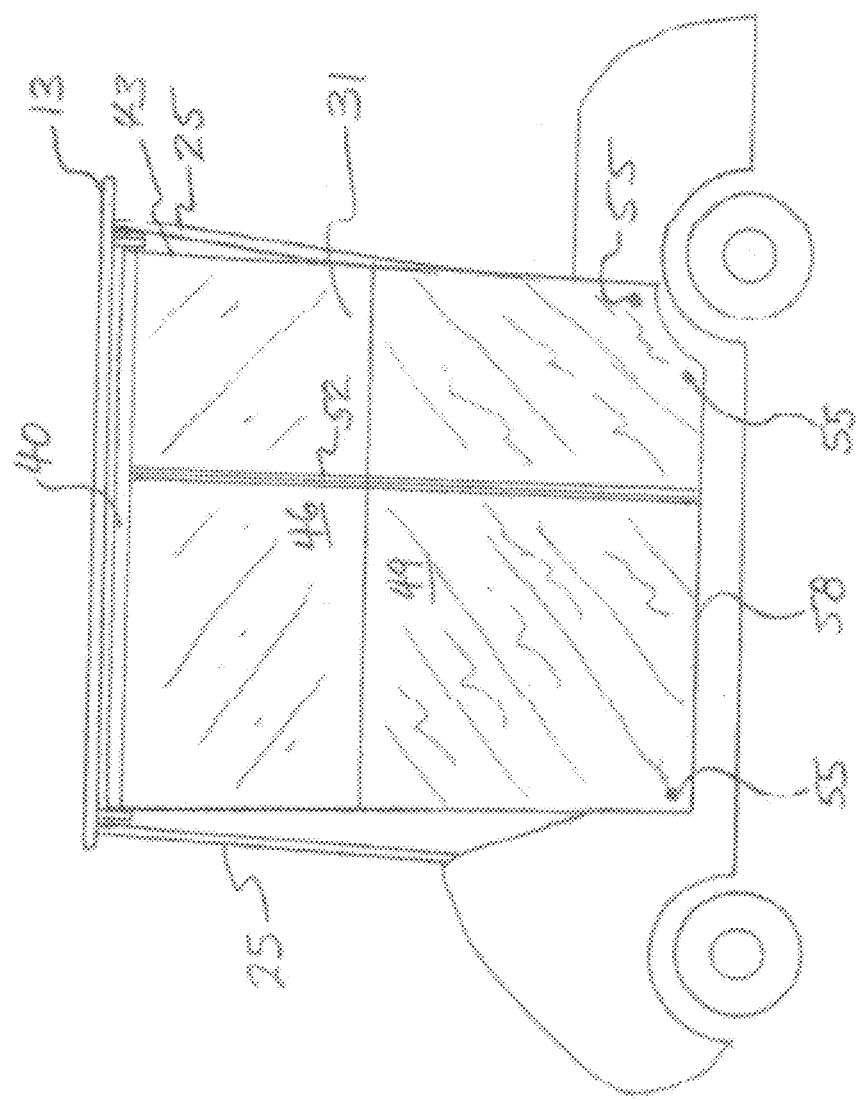

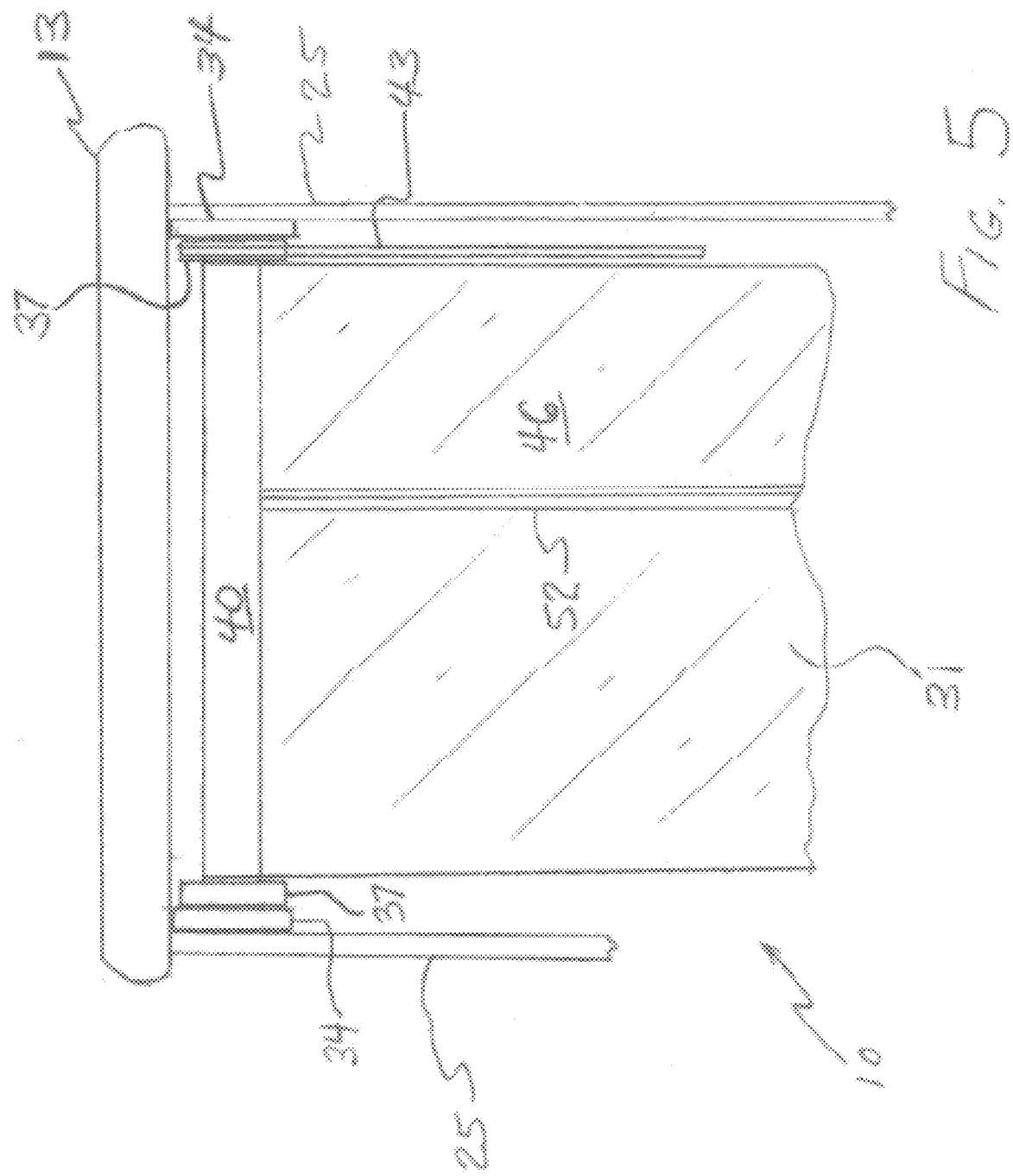

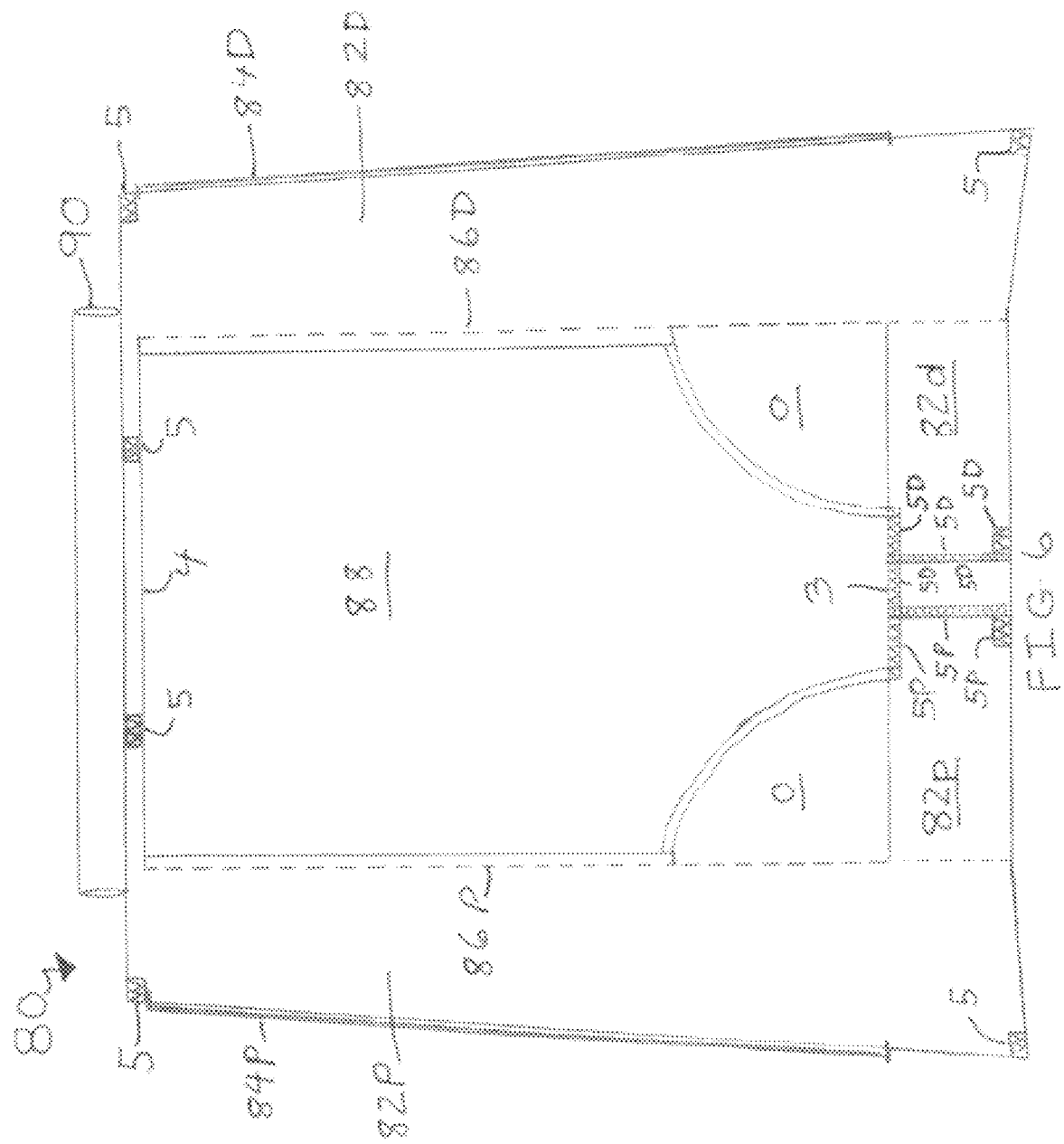

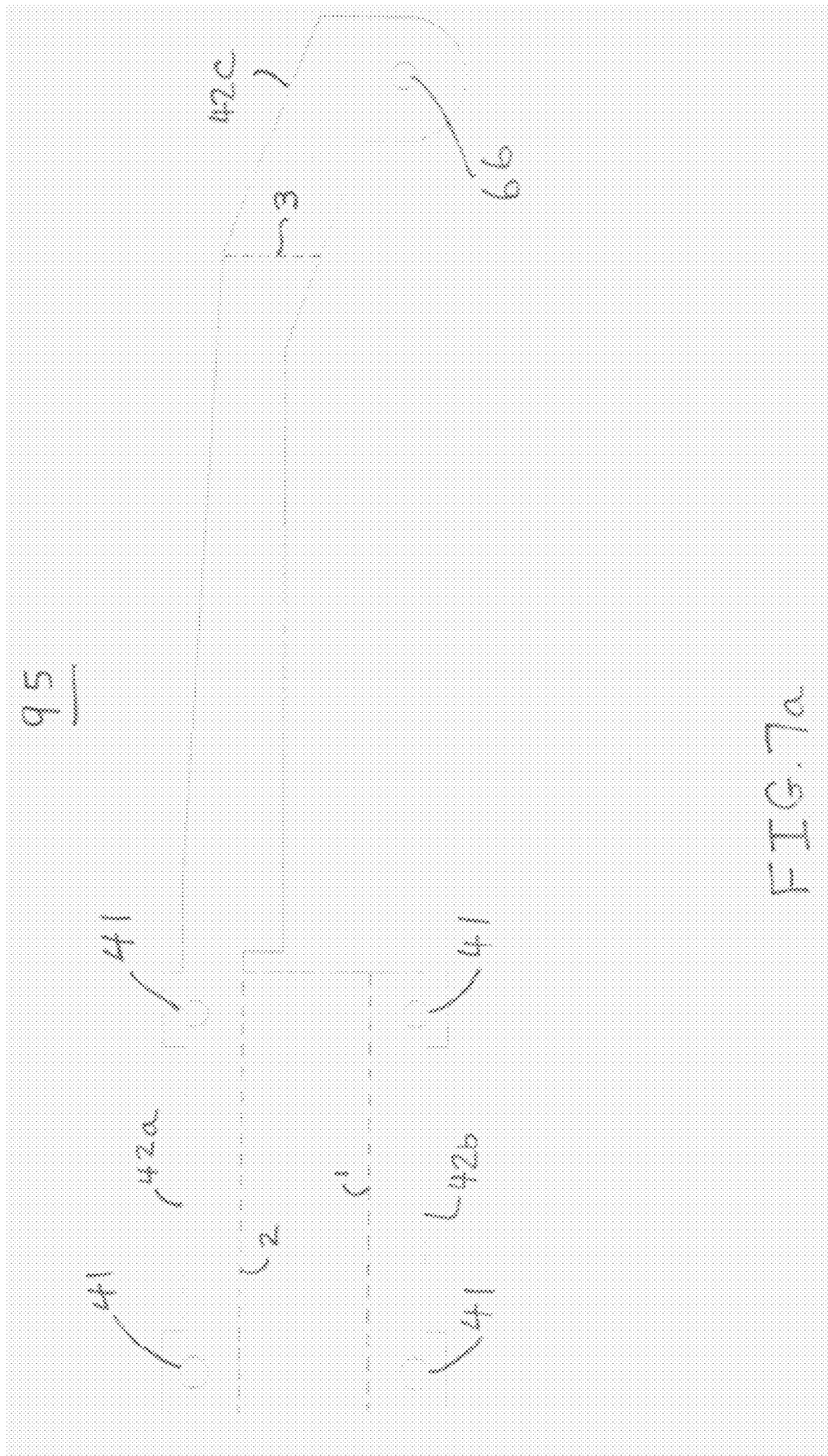

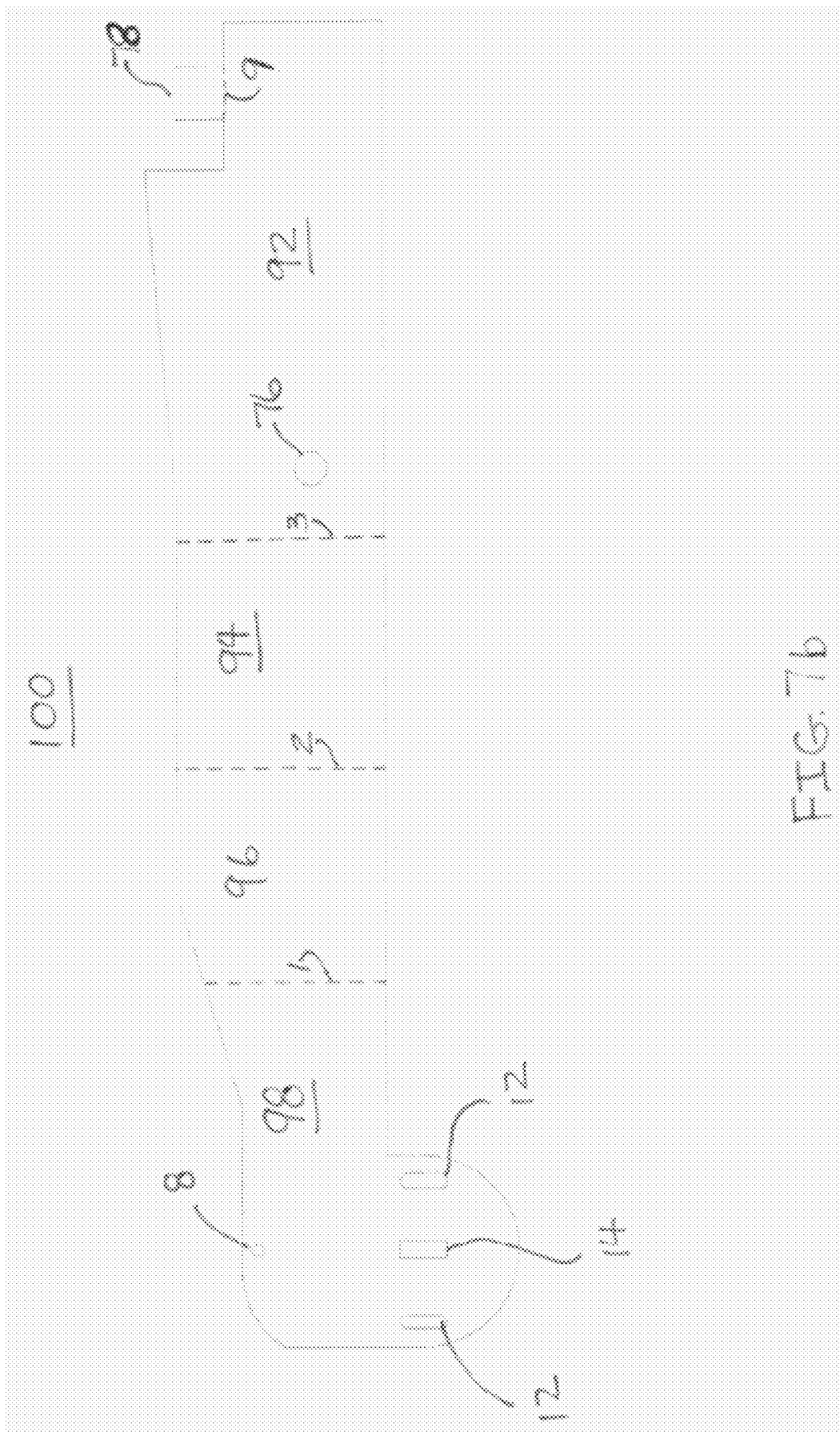

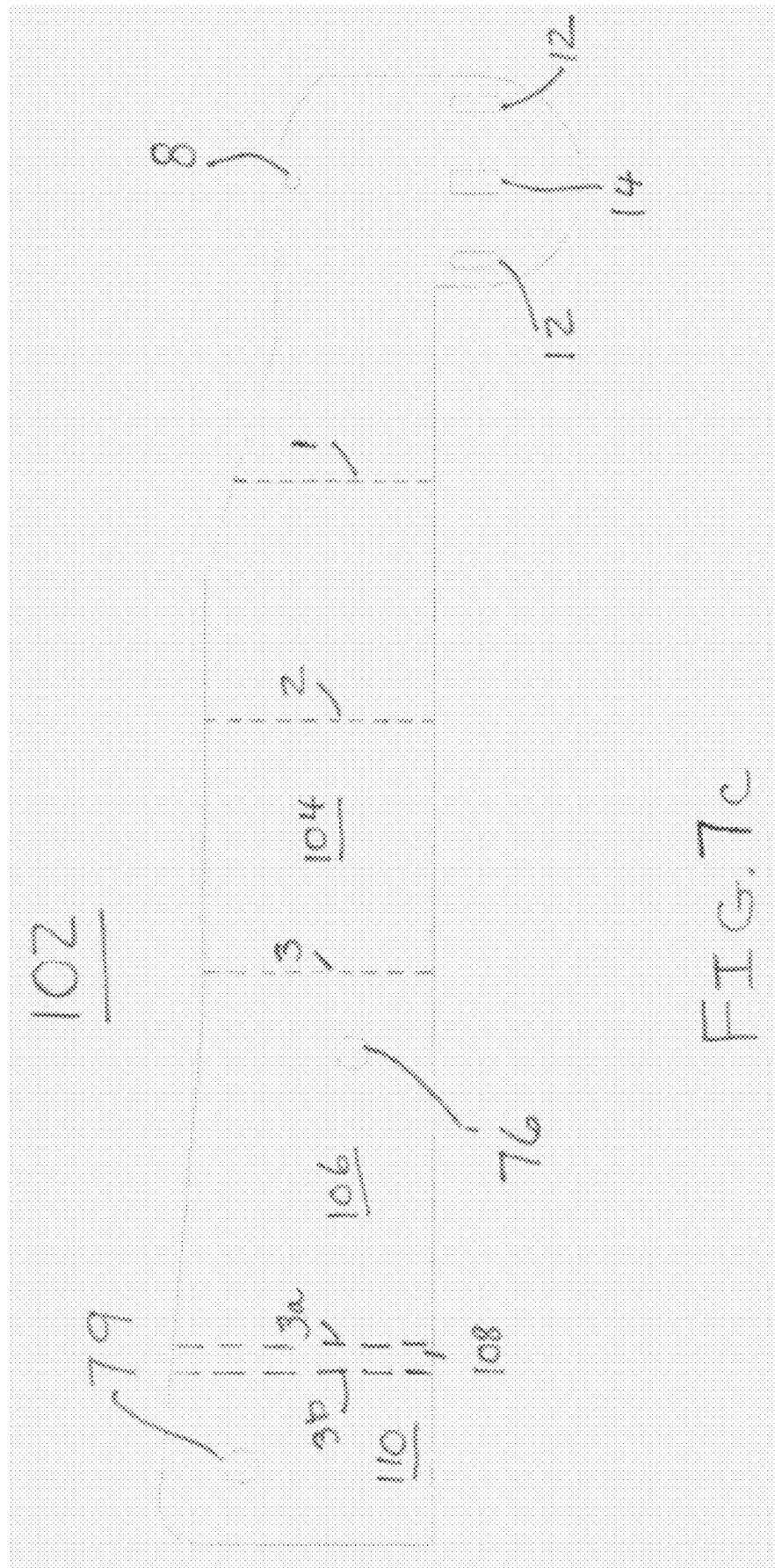

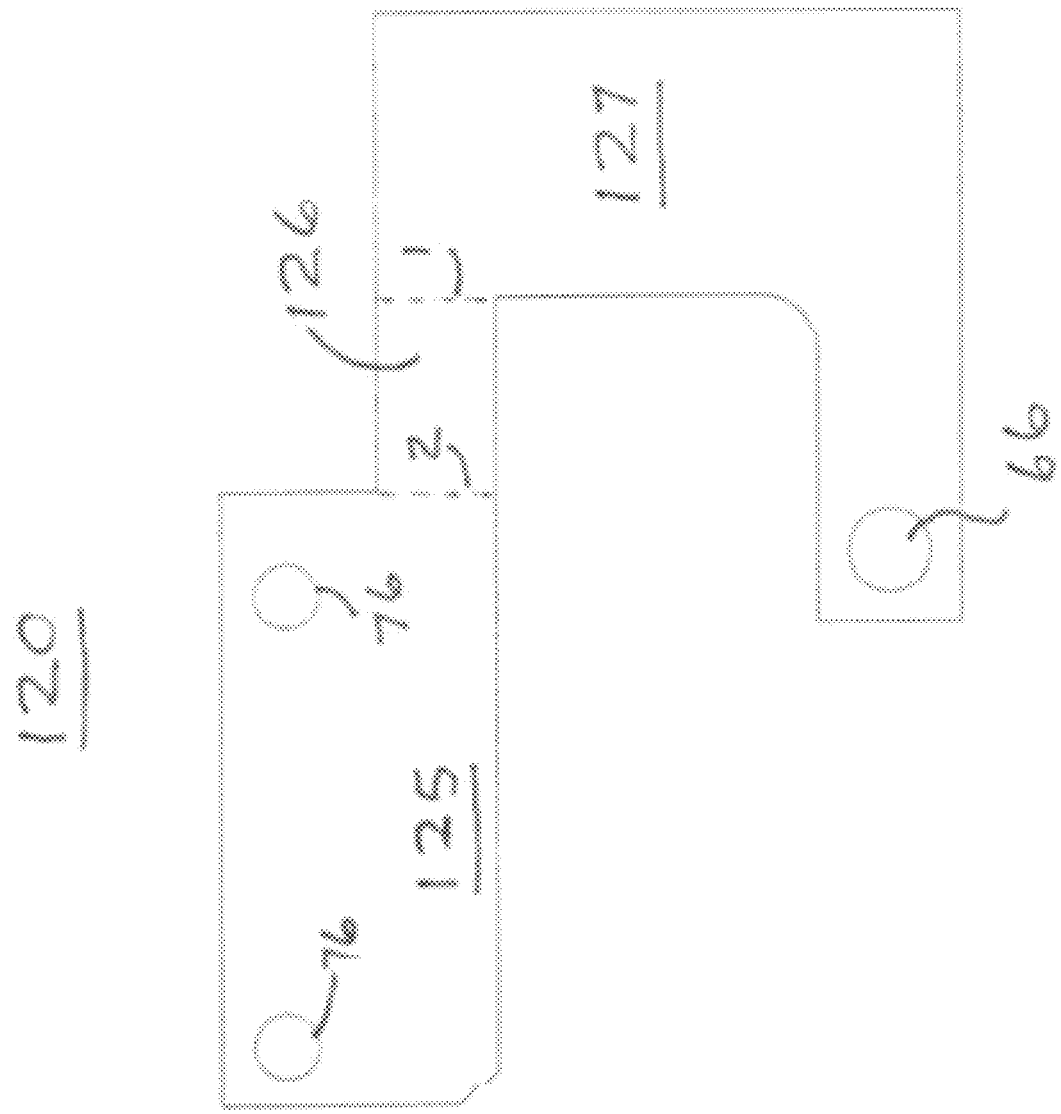

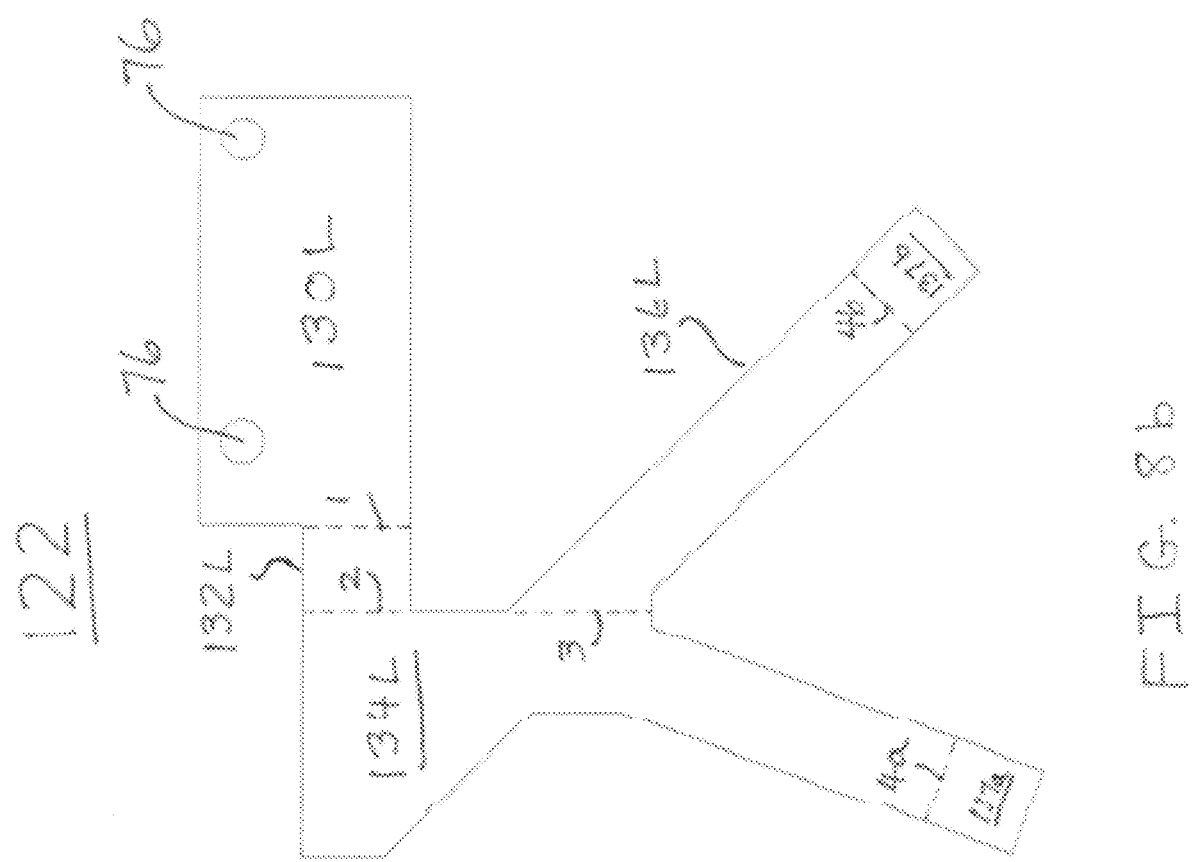

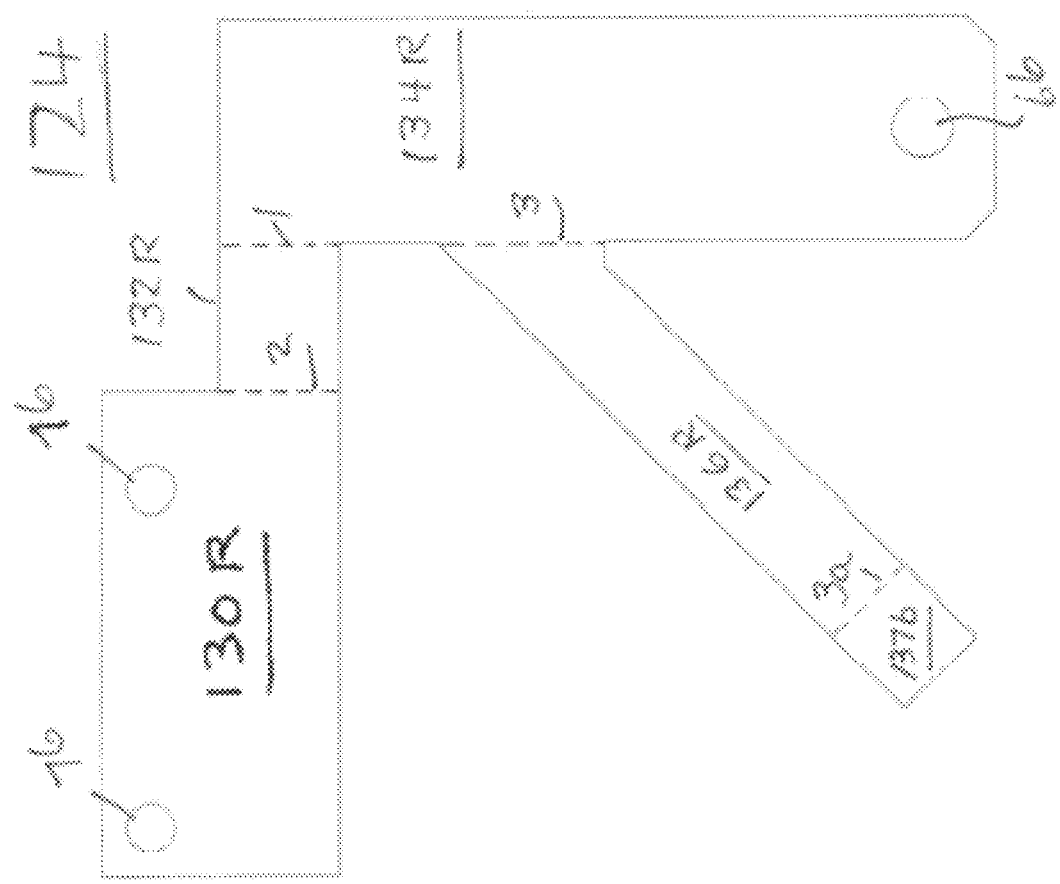

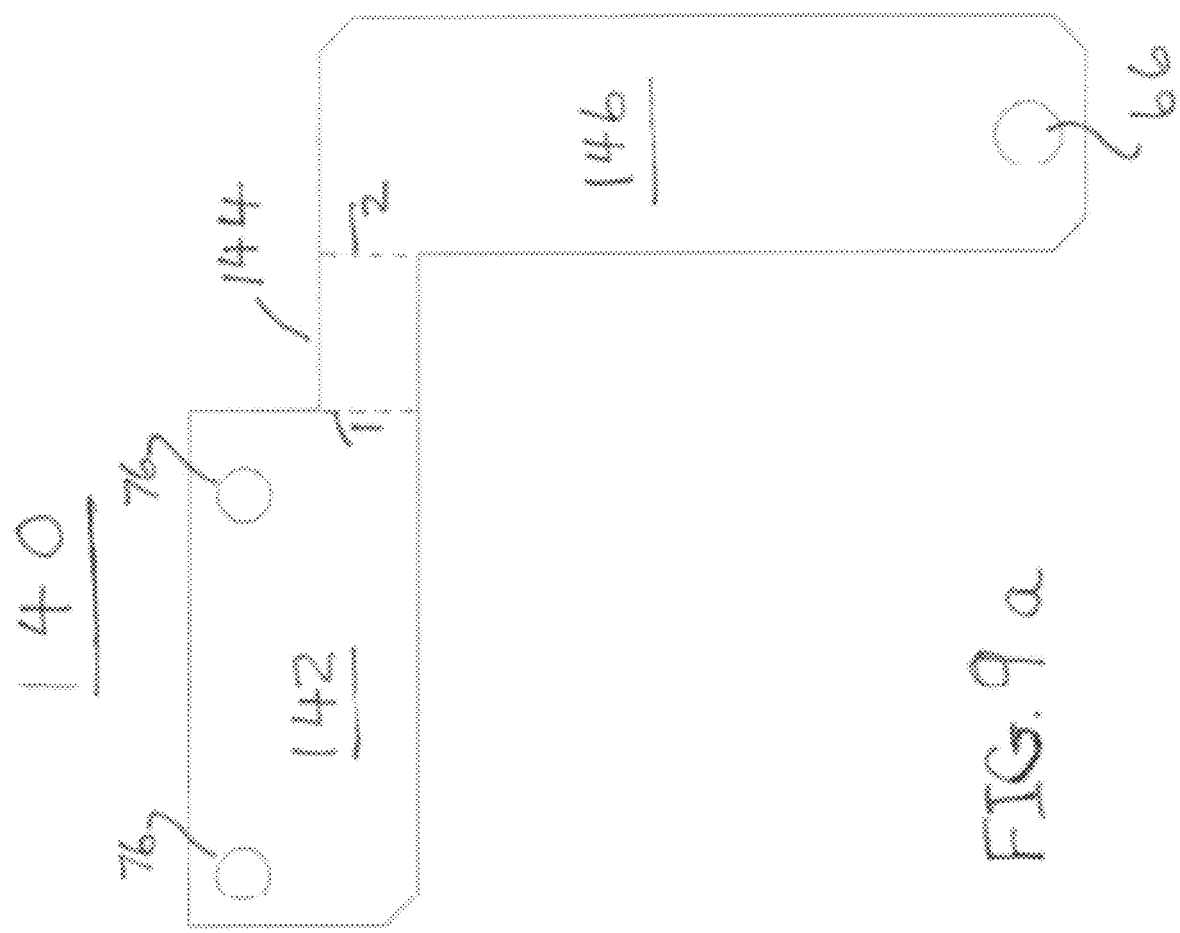

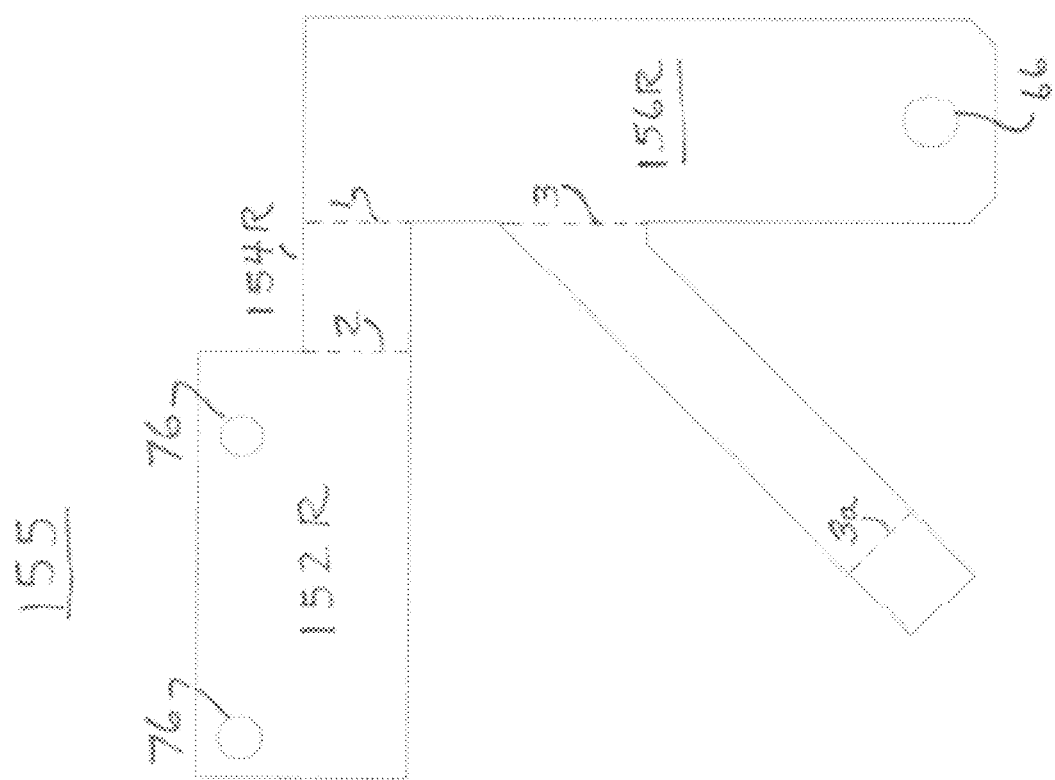

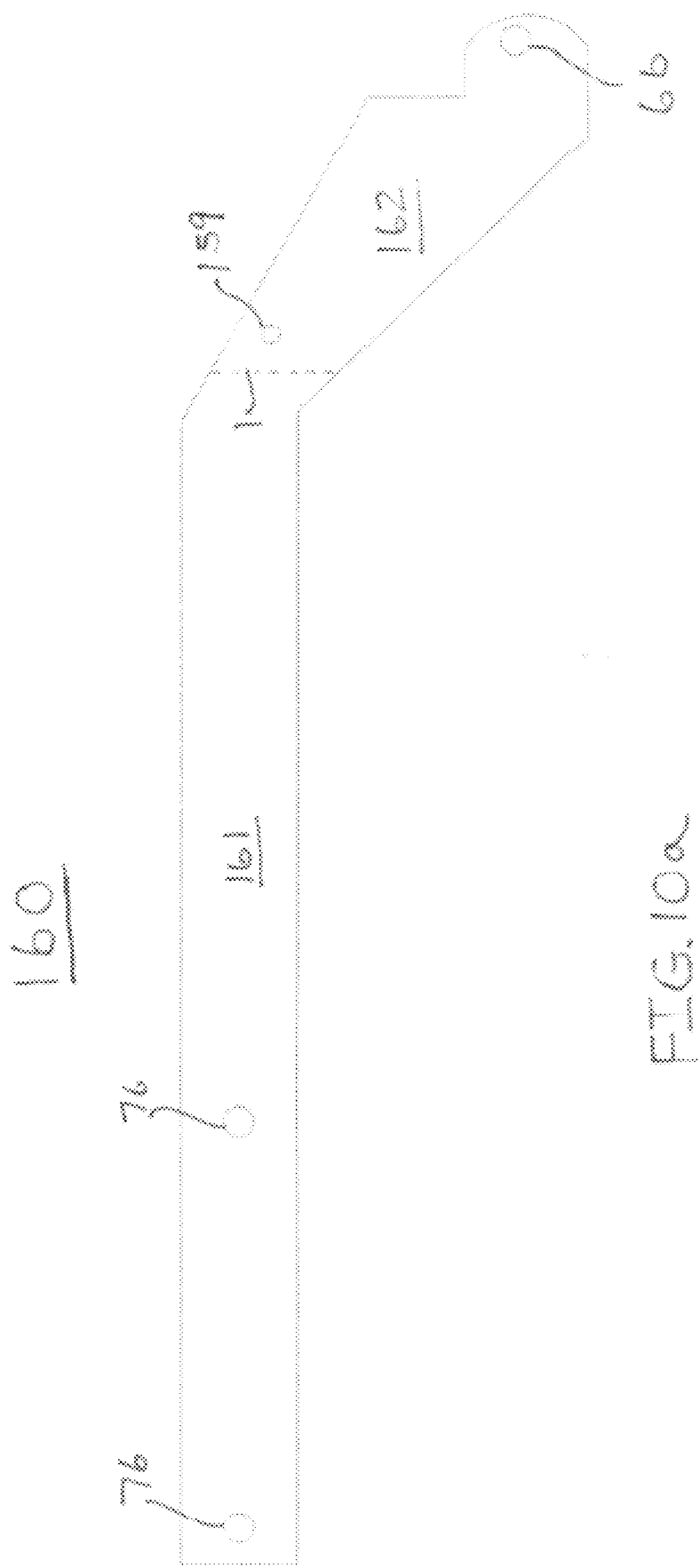

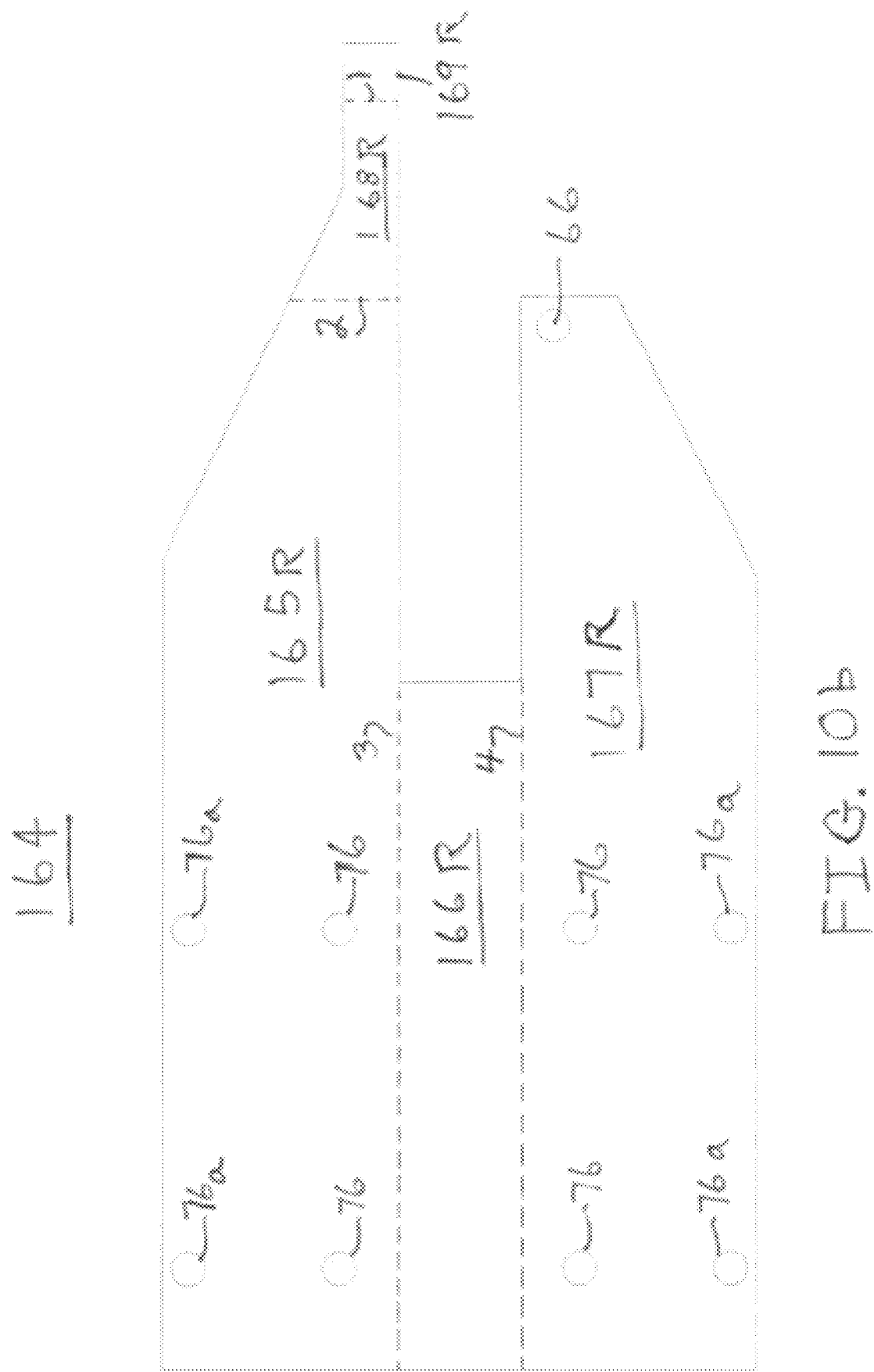

MECHANIZED OR MOTORED RETRACTABLE ENCLOSURE PANELS AND THEIR SUPPORT BRACKETS

CROSS-REFERENCE TO RELATED APPLICATIONS

This Non-Provisional Application for Patent claims the benefit of Provisional Application No. 61/107,658 filed Oct. 22, 2008 and Non-Provisional application Ser. No. 12/604,080 filed Oct. 22, 2009.

STATEMENT REGARDING FEDERALLY SPONSORED RESEARCH OR DEVELOPMENT

Not Applicable

REFERENCE TO SEQUENCE LISTING, A TABLE OR A COMPUTER PROGRAM LISTING COMPACT DISK APPENDIX

Not Applicable

BACKGROUND

The present invention relates generally to open-car enclosures and, more particularly, to an inventive concept that provides brackets custom designed for each model car to support driver's side, passenger's side, and rear enclosure panels. Installation of the brackets require no alteration to the car, require only about 20 minutes to install, and are attached to the car's vertical or horizontal pre-existing roof supports and roof support bolt holes. Only 4 brackets are required to support the three panels that may be mechanized or motorized.

The background information discussed below is presented to better illustrate the novelty and usefulness of the present invention. This background information is not admitted prior art.

Electric golf-carts (officially referred to as a golf car because it is self-propelled) were originally designed to carry two people and their golf clubs around a golf course. More recently, open-air cars, which classification includes golf-carts, come in a wide range of styles and are frequently used to convey from two to up to ten, and occasionally more, passengers at speeds of about less than 15 mph (24 km/h). The smaller cars are generally around 4 feet wide by 8 feet long and 6 feet high and weigh from about 900 to 1,000 pounds.

Originally gas-powered, open-air cars, now mainly electric powered, are mass produced for private consumer use. A variety of styles and sizes of open-air cars is now used in many communities because of their greatly reduced pollution potential, lack of noise, and increased safety for pedestrians and other cars (due to slow speeds). When built for general transportation the open-air cars are referred to as Neighborhood Electric Vehicles (NEV). Although, these carts resemble the carts made exclusively for use on the golf course, their use has extended to year round, all weather use.

The demand for NEVs continues to grow for several reasons. For example, many citizens of Peachtree City, Ga. regularly use the carts to travel the many miles of golf-cart paths that link the city together. The high school population of Peachtree relies so heavily on golf-cart travel to and from school, the local high school has provided a parking lot dedicated to student golf-carts. In areas that restrict, or prohibit, the use of fossil fuel powered motor vehicles most residents and visitors rely on NEVs. The year-round use of NEVs in retirement communities is steadily the most popular form of transportation.

The rise in popularity of the open-air cars, including golf-carts, has led to the modification of the cars to suit their intended use. Open-air cars typically come with a roof, often referred to as a "sun-roof" and a windshield panel of various designs. Additional modifications, especially for carts used mainly as golf cars, include: ball cleaners, cooler trays, upgraded motor or speed controller, lift kits, and covers. Covers, also known as enclosures, are particularly well-suited for protecting the occupants of the car from the elements, including wind, cold, snow, and rain, and are especially appreciated in the more inclement weather seasons. Early covers were constructed as "throw-overs", where a single, very large cloth would be thrown over the entire vehicle to cover the sides as well as the top. A strap sewn onto the inner surface of the cover was used to secure the cover to the car once it was positioned over the roof and hang down the sides. It was soon realized, that as most cars had roofs, the roof covering part of the throw-over was not needed and, thus, added unnecessary cost and weight. Currently, enclosures generally consist of panels that hang from the roof area to protect the occupants from the weather. Two-seater open-car enclosures are constructed of three enclosure-panels, one for each side and one for the back, with each panel having an affixed non-ratable bar or elongated-tab extending along the length of the top edge of the panel. The bar or tab slides into a track that has been mounted to the roof of the cart for that purpose. Screws are often used to affix the track to the roof. When deployed, the cover hangs from the track toward the ground. Toward the lower edge of the cover there may be fasteners to engage with mating fasteners attached to the cart. The top portion of such enclosures is generally made from a transparent material, while the bottom portion is made from a durable opaque material. In this manner, occupants of the car can see out of it when the enclosure is deployed. When the occupants of the car do not want the cover deployed, they may raise the cover toward the roof, and fasten the cover in place using straps, or the like, that may adhere to a valence, or awning, that is attached about the roof for the purpose of providing a support for the un-deployed panel. Each time another seating row is added to the cart, another set of panels is also added. Thus, four-seaters have two panels per side for a total of five panels, not counting the windshield panel. Six seaters require seven panels and so on.

SUMMARY

The present inventor recognized that many who own open-air cars such as golf carts wish to have front, side, and rear protective panels installed in their cart. Installation of such enclosure-panels however is difficult, time-consuming, and requires modifying the cart, which means making irreversible alterations to the cart. Once such protective panels are installed, they are difficult to deploy and un-deploy. For example, when a side enclosure-panel is in its deployed position and a user seeks to un-deploy the panel, the user must first detach each panel from its adjacent panels, manually roll the panel about itself, and while holding the panel in the rolled position with one hand, must position a strap, or other holding device, about the rolled panel and then, with only the other hand must affix the strap to the frame so that the panel will stay in the rolled position. Many people are physically not able to accomplish this, and others feel it is an unnecessary annoyance. Moreover, when a user would like to deploy the covering panel, the holding strap must be un-affixed in order for the panel to be rolled-out. If a user is not strong, and/or dexterous, enough to support the panel in its rolled position while simultaneously releasing the strap, the panel could move to the deployed position in a fast and dangerous movement as gravity accelerates the heavier, lower section of the panel toward the ground. Deploying and un-deploying enclosure-panels increases in difficulty and becomes more time consuming as the number of passenger per car increases. For example, a four-seater car requires two separate panels per side, as the weight of one panel wide enough to cover a front and back seat side area is too great for most people to support while rolling and unrolling. Moreover, it is not only the weight of the panels, but the number of panels that must be separately and manually deployed and undeployed, that causes the job to become unwieldy. For example, a four-seater car requires five panels to be manually rolled and unrolled, a six-seater requires seven, and an eight-seater requires nine panels. Open-air-cars that seat up to 10 people are becoming more common. A ten-seater car requires eleven panels to be manually rolled and unrolled. For example theme parks, resorts, and hotels rely on the multiple seat cars regularly and although some of these cars are operated by professionals hired for that purpose, the time and energy is still unacceptable. Home ownership of multiple-seater open-air cars, is also growing, For example, a host living near a beach or other attraction, often prefers to transport his guests to and from his home as one group instead of making multiple trips to transport his entire party, thus requiring ownership of a multi-seater car.

Accordingly, the present inventor developed an inventive concept that lead him to conceive a set of principles to provide for the installation of mechanized and/or motored activated enclosure-panels for open-cars and open-boats of any size or style. The invention as illustrated is for vehicles having an existing roof structure, although, a frame made especially to hold the retractable, mechanized and/or motorized panels is contemplated for vehicles that do not currently have an existing roof structure. The first principle of the present invention is to provide a set of brackets for the easy installation of protective panels. The second principle was to design the brackets to be installed with a minimum of effort and in a time as short as twenty minutes and, importantly, enable bracket installation without requiring any alteration to the cart. Another principle provides for this enhanced installation into the different styles of cars. Each car has a different roof and roof support design and to provide for installation using a car preexisting bolt holes, so as to eliminate modifying the cart, the brackets are designed for each style cart. To provide for the brackets and panels to be installed in less than 20 minutes with no drilling required in most cases, the inventor invented brackets that support the spindle about which a panel is wound or unwound that get bolted directly into preexisting roof bolts holes of the roof supports. Thus, taught below are several styles of brackets required for the installation of the panels in variously styled cars. The brackets include brackets designed and structured for installation in a Club Car Precedent two seater golf cart, a Club Car DS four seater golf cart having a Custom Golf Car Supply Roof with a track system, a Club Car Precedent four seater golf cart having a Custom Golf Car Supply Roof with a track system, a Club Car DS two seater golf cart and an EZ-Go Golf Car. The bracket designs presented here are just an example of the designs required to provide enclosure panels on the wide variety of open vehicles that would benefit from such panels. For a two-seater Precedent model there can be a hole drilled through the elongate bracket to accept a set screw to provide extra support for the bracket against the stanchion. Additionally, in the models that use a custom made roof that employs a track bar connected to the roof about the interior perimeter edge, the brackets are attached to the track bar using screw-type connectors that fit through the apertures drilled through the bracket and track bar.

As mentioned above, currently available enclosure panels have either a non-rotable rod or a thick, but narrow hem like feature at the top boundary of the enclosure. This rod or hem is used to attach the panel to the car by inserting the rod or hem into a track that must be installed on the roof or roof frame for this purpose. Thus, disclosed herein then, are the means needed and the methods used to make, install, support, and use enclosure-panels that can take advantage of mechanized and/or motorized means of deployment and un-deployment without requiring installation of a track, as is required by others. Moreover, the principles taught herein make multiple panels on the sides of open-air cars that carry more than two passengers redundant and no longer required. Only one panel is required per side regardless of the number of passengers because the mechanized and/or motorized structure provide for ease of opening any width panel provided by the present invention. This is a saving of time during use because there are no longer separate side panels that must be separated from, or attached to, their adjacent panels before they could be un-deployed or deployed, respectively. There is also a savings of time and of cost during manufacture. The principles of the invention include ways to protect passengers and the interior of the car from open spaces at corners and to protect the storage units that often are included within the rear portion of the cart.

To un-deploy, or retract, a panel, it is first detached from its adjacent panels. In the examples provided herein, the detachment is achieved by unzipping the zipper-connection attaching a panel to an adjacent panel. In the case of a driver's-side panel, the panel is detached from the "windshield" panel and from the rear-opening panel. Once the panel to be undeployed is detached, it may be undeployed by, as in the example provided, activating a pull-chain. Simply pulling on the chain will cause the panel to roll-up. In its rolled-up position, the panel is secure and will not unroll until the pull-chain is activated in the opposite direction. To keep the end of the panel from flapping in the wind, snaps, are available on the panel to be snapped into available mating snaps. To un-retract, or deploy, the panel, the pull-chain is pulled in the opposite direction. Once the panel is fully deployed, it is ready to be reattached (zipped) to its adjacent panels and snapped into place, this time using the snaps that are available on the panel to be snapped on snaps that are installed on the body of the cart. With respect to the side panels, occupants may exit and enter the car by opening the panel. In each side panel there is a zipper in approximately the center of the panel extending from the top of the panel to the bottom of the panel to provide an opening in the panel for entry into or exit out of the car.

The two side panels are right- and left-hand mirror images of each other. The back panel is made to protect both the passengers and whatever is in the boot from the elements. To do this, the back panel has side flaps to provide for corner coverage. To retract a back panel, its side panels are detached from each of the driver's-side panel and the passenger's side panels. Once the back panel is fully detached, its side flaps are folded up against the main portion of the back panel. In this configuration, the back panel is now ready to be retracted and, as in the example provided, the pull-chain is used to retract the back panel. The panels are available, if desired, in a motorized version so that opening or closing panels may be accomplished by pushing a button or working a lever. Thus, each panel includes a rotable spindle having either a spring-action end or a panel height-adjustment mechanism, or a rotable spindle that is controlled by a motor. Only a single panel is required per side of open-air vehicle regardless of the size of the vehicle or the number of passengers which it is designed to carry.

BRIEF DESCRIPTION OF THE DRAWINGS

In order that these and other objects, features, and advantages of the present invention may be more fully comprehended and appreciated, the invention will now be described, by way of example, with reference to specific embodiments thereof which are illustrated in appended drawings wherein like reference characters indicate like parts throughout the several figures. It should be understood that these drawings only depict preferred embodiments of the present invention and are not therefore to be considered limiting in scope, thus, the invention will be described and explained with additional specificity and detail through the use of the accompanying drawings, in which:

FIG. 1 is a side elevation view illustrating a golf-cart without any side covers.

FIG. 2 is a side elevation view of a golf-cart, as shown in FIG. 1, with the addition of the golf-cart enclosure in the undeployed position following the principles of the present invention.

FIG. 3A is an enlarged side elevation view of a cart-roof-frame, sunroof, and a golf-cart enclosure panel of the present invention installed onto a roof-frame stanchion, in an undeployed position, and activated using a pull-chain mechanism.

FIG. 3B is an enlarged side elevation view of a cart-roof-frame, sunroof, with one golf-cart enclosure panel of the present invention installed under the roof, in an undeployed position, and activated using a motorized mechanism.

FIG. 4 is a side elevation view of a golf-cart, as shown in FIG. 1, sunroof with a single golf-cart enclosure panel of the present invention installed onto a roof-frame stanchion and in a deployed position.

FIG. 5 is an enlarged side elevation view of a cart frame and sunroof with one golf-cart enclosure panel of the present invention installed onto a roof-frame stanchion and in a deployed position.

FIG. 6 is an enlarged elevation view of an enclosure panel designed for use on the rear opening of a car.

FIG. 7a-7c are plan views of brackets designed to fit a Club Car Precedent golf car fitted with a Custom Golf Car Supply roof.

FIG. 8a-8c are plan views of brackets designed to fit a DS four-seater Custom Golf Car Supply.

FIG. 9a-9c are plan views of brackets designed to fit a Precedent Custom Golf Car Supply that is a four-seater golf car.

FIG. 10a-10D are plan views of brackets designed to fit a DS two-seater.

A LIST OF THE REFERENCE CHARACTERS AND PARTS TO WHICH THEY REFER OPEN SPACE

Figure 7D:
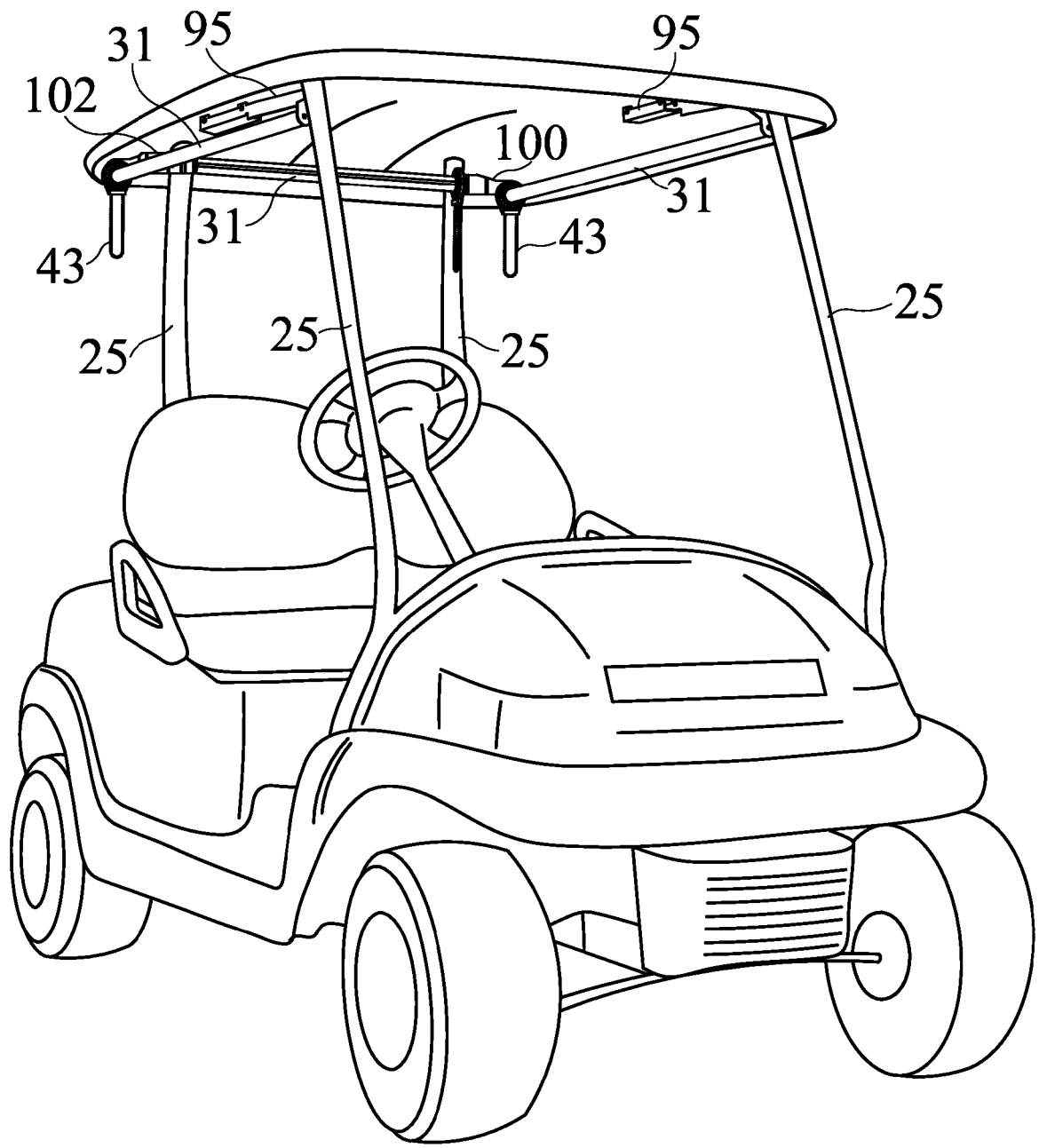
FIG. 7D is a perspective view of a two-seater Club Car Precedent golf car with a set of brackets, as shown in FIG. 7a-7c, installed with three enclosure panels in place.

0 Fold line.
1 Fold line.
2 Fold line.
3a Fold line.
3b Fold line.
4 Top edge of transparent rear panel 88.
4a Fold line.
4b Fold line.
5 Hook and loop attachments.
5D Hook and loop attachments that are positioned on flap 82D.
6 Bottom edges of side flaps 82.
7 A golf-cart.
8 Fold line.
10 An enclosure according to the principles of the present invention.
13 A roof for golf-cart 7.
16 A seat of golf-cart 7.
19 A steering wheel of golf-cart 7.
22 A foot pedal of golf-cart 7.
25 Roof stanchions that make up the frame used to support roof 13.
31 An enclosure-panel, according to the principles of the present invention.
34 Brackets.
37 Support wheel.
40 Spindle (rotating shaft about which a panel is wound and unwound).
41 Apertures to accept bolts.
42a Bracket part.
42a Opposing bracket part.
42c Bracket part.
43 Flexible pull-chain, roller pulley, or spring mechanized activator.
46 Translucent upper portion of an enclosure 31 for golf-cart 7.
49 Opaque lower portion of an enclosure 31 for golf-cart 7.
52 Zipper.
55 Fasteners.
58 Lower edge of enclosure 31.
61 Fastener mates for fasteners 55.
66 Aperture for receiving spring end of spindle panel.
70 Motor for motorized the deployment and un-deployment of the panels.
76 Bolt receiving aperture.
76a Bolt receiving aperture.
78 Tab for tab receiving aperture of panel spindle.
80 A rear enclosure-panel for the rear side opening of an open-air car.
82D A foldable side flap on passenger's side.
82P A foldable side flap on passenger's side.
82d A rear bottom driver's flap.
82p A rear bottom passenger's flap.
84D A zipper attachment on flap on driver's-side.
84P A zipper attachment on flap on passenger's side.
86D A fold-line on driver's-side.
86P A fold-line on passenger's side.
88 A transparent section of the rear enclosure-panel 80.
90 A rotable spindle.
92 A section of bracket 100.
94 A section of bracket 100.
95 Bracket for both front-end sides of Custom Golf Car Supply's Precedent two seater.

96 A section of bracket 100.
98 A section of bracket 100.
100 Bracket for left rear-end driver's-side Custom Golf Car Supply's Precedent two seater.
102 Bracket for right rear-end passenger's side Custom Golf Car Supply's Precedent two seater.
104 A section of bracket 102.
106 A section of bracket 102.
108 A section of bracket 102.
110 A section of bracket 102.
120 Bracket for both front-end sides of Custom Golf Car Supply's DS four seater.
122 Bracket for left rear-end (driver's-side) Custom Golf Car Supply's DS four seater.
124 Bracket for right rear-end (passenger's-side) Custom Golf Car Supply's DS four seater.
125 A section of bracket 120.
126 A section of bracket 120.
127 A section of bracket 120.
130L A section of bracket 122.
130R A section of bracket 124.
132L A section of bracket 122.
132R A section of bracket 122.
134L A section of bracket 122.
134R A section of bracket 122.
136L A section of bracket 122.
136R A section of bracket 122
137*a* Tab for tab receiving aperture.
137*b* Tab for tab receiving aperture.
140 Bracket for both front-end sides of Custom Golf Car Supply's Precedent four seater.
142 A section of bracket 140.
144 A section of bracket 140.
146 A section of bracket 140.
150 Bracket for left rear-end (driver's-side) Custom Golf Car Supply's Precedent four seater.
152L A section of bracket 150.
154L A section of bracket 150.
156L A section of bracket 150.
158L A section of bracket 150.
155 Bracket for right rear-end (passenger-side) Custom Golf Car Supply's Precedent four seater.
152R A section of bracket 155.
154R A section of bracket 155.
156R A section of bracket 155.
158R A section of bracket 155.
159 Set screw aperture.
160 Bracket for both front-end sides of a Club Car DS two seater.
161 A section of bracket 160.
162 A section of bracket 160.
164 Bracket for rear passenger side of a Club Car DS two seater.
165R A section of bracket 164.
165L A section of bracket 174.
166R A section of bracket 164.
166L A section of bracket 174.
167R A section of bracket 164.
167L A section of bracket 174
168R A section of bracket 164.
168L A section of bracket 174.
169R A section of bracket 164.
169L A section of bracket 174
174 Bracket for rear driver's side of Custom Golf Car Supply's DS two seater.
176 A brace.
202 Bracket set for the driver's side of an EZ-Go cart.
203 Bracket set for the passenger's side of an EZ-Go cart.
204 Front bracket for the passenger's side of an EZ-Go cart.
205 Front bracket for the driver's side of an EZ-Go cart.
207 Rear bracket for the passenger's side of an EZ-Go cart
206 Rear bracket for the driver's side of an EZ-Go cart.
250 Vent panel.
252 Slide track.
254 Welt on vent panel 250.
256 Vent panel 250 zipper 256.

DEFINITIONS

Mechanization, as used herein, refers to providing human operators with machinery that assists them with the muscular requirements of work. It can also refer to the use of machines to replace manual labor if the mechanization includes powering the mechanism by a motor.

Motorized, as used herein, refers to supplying a source of power to do what would otherwise be done manually or non-motorized mechanically.

It should be understood that the drawings are not necessarily to scale. In certain instances, details which are not necessary for an understanding of the present invention or which render other details difficult to perceive may have been omitted.

DETAILED DESCRIPTION

Referring now, with more particularity, to the drawings, it should be noted that the disclosed invention is disposed to embodiments in various sizes, shapes, and forms. Open-air cars come in many different models of a variety of sizes and shapes including cars for two people to ten or more people, and with or without having storage compartments for golfing and/or other types of equipment or objects. Each model requires enclosure panels that must be designed to meet their particular needs. The mechanized or motorized retractable enclosures made according to the principles of the present invention are contemplated for use on any type of cart or vehicle, such as wagons and ATVs, including vehicles for use on the water. Therefore, the embodiments described herein are provided with the understanding that the present disclosure is intended as illustrative and is not intended to limit the invention to the embodiments described herein.

The principles of the present invention are directed towards a product that includes brackets custom designed for individual car styles, for rotable enclosure panels that are able to provide complete protection from weather from both sides, the rear and the corners. The brackets taught herein are able to be installed in a cart quickly easily by removing the preexisting bolts that are securing the car's roof to the roof support structures from their preexisting bolt holes, adjusting the brackets so that the bracket's attachment bolt holes are in line with the preexisting bolt holes, and reinserting the bolts. This part of the installation takes less than twenty minutes, can be accomplished without any specialized tools, and does not require any modification to the car. The enclosures taught herein have from one to three or more enclosure-panels. Each panel is easily and quickly deployed and un-deployed using the mechanized or motorized roller mechanism according to the principles of the present invention. No longer does a user have to roll a panel about its roller by hand and no longer does a user have support the rolled panel until it is fastened in place. Moreover, no longer are multiple panels per side required. Because of the ease of deployment and un-deployment of the panels of the present invention, only one panel, regardless of width, is required per side, which means saving on the amount of materials of making, as well as saving on the time of making and of using. According to the principles of the present invention, each panel of the enclosure is rolled open and closed independently by action of a pull-chain, or the like, a spring-roller mechanism, or a motorized-roller. Once each panel is rolled-up in its un-deployed position, it is simply snapped closed using the snaps that are provided as part of the system.

FIG. 1 illustrates golf-cart 7 which is an example of a typical open-air-car. Such cars generally have one or more seats 16, the car illustrated seats two people, although cars seating four to ten or more people are becoming more common, steering wheel 19, and foot pedal 22 that are used to accelerate or decelerate car 7, as desired by the driver. Golf-cart 7 is equipped with sun-roof 13 to protect the car's passengers from the elements, but otherwise leaves the passengers vulnerable from the effects of cold and wet due to low temperatures, wind, and rain. Roof 13, often referred to as a "sun canopy" is typically supported by a roof frame comprising individual stanchions 25. As is well-known in the art, there are many styles of cars, each having their own style of roof and roof stanchions. Additionally, there are roof makers who make specialty roofs that are desired by many and, thus, many car owners replace the roof that came with the car by one of the specialty roofs. It should be understood, therefore that the stanchions and roof designs illustrated in the accompanying figures are only a few of many styles.

FIG. 2 illustrates one panel of enclosure 10 in its un-deployed position, that is, rolled-up and secured out-of-the way by use of self-supplied fasteners, such as commonly available snap fasteners. Enclosure side-panel 31, made according to the principles of the present invention, designed for use on the driver's-side of golf-cart 7, is mounted to roof stanchions 25 using brackets 34 that are more clearly illustrated in FIGS. 7A to 11b. Flexible pull-chain 43 is used for activating retractable panel 10. Regardless of the number of passengers the car is designed to hold, only one panel 10 is required. Because the retraction and un-retraction of panel 10 is mechanized and/or motorized, panel 10 is able to be constructed as wide as required to provide for the panel to be a secure, protective, enclosure for all passengers. This would not be possible without the mechanization and/or motorization of the rotation of the panel because the panel otherwise would be too heavy and too unwieldy to deploy and un-deploy manually.

FIG. 3A, an enlarged side elevation view, illustrates enclosure-panel 31, again in its un-deployed, that is, rolled-up position, as illustrated in FIG. 2. FIG. 3A indicate brackets 34 that, in this example, are securely fastened to roof stanchions 25 with attachment means 12, such as the screws (not shown), to securely support enclosure-panel 31 to the cart. Rotatably attached to each bracket 34 is support wheel 37, with spindle 40 (spindle can be seen in FIGS. 4 and 5) being attached to the support wheel. In the un-deployed position, enclosure-panel 31 is fully and securely wound around spindle 40. A mechanism for rolling and unrolling enclosure-panel 31 is taught. In the example illustrated, the mechanism is a roller pulley, such as pulley chain 43 that may be provided on one of the support wheels 37. Activator 43 provides for a user to rotate wheel 37, which in turn rotates spindle 40, causing enclosure-panel 31 to roll or unroll from spindle 40, depending on the direction in which the wheel 37 is turned. By pulling on the activator 43, the enclosure-panel may be deployed or un-deployed, as desired. It is to be understood that a pulley chain is only one mechanism that may be used to provide for easy and rapid mechanized rolling and unrolling of enclosure-panel 31. In addition to any type of flexible pull-chain, a roller pulley, or spring mechanized activator, could just as easy be used. Additionally, any mechanized or motorized means is contemplated for use. The choice of means depends entirely on the desires of the user.

FIG. 3B, another enlarged side elevation view, illustrates enclosure-panel 31, again in its un-deployed, rolled-up position, secured to horizontal roof stanchions using brackets 34. FIG. 3B also illustrates motor 70 providing for the motorized deployment and un-deployment of panel 31. The motor is activated, in this embodiment, by a switch on the dashboard provided for that purpose.

FIGS. 4 and 5 illustrate enclosure-panel 31 in a deployed position. In this position, each end of spindle 40 is illustrated rotably attached to each support wheel 37 which in turn is supported by bracket 34. Enclosure-panel 31 includes transparent upper portion 46 and opaque lower portion 49. Enclosure-panel 31 also may include zipper 52. When zipper 52 is unzipped, the occupants are allowed to easily exit or enter golf-cart 7 even with panel 31 in its deployed position. Fasteners 55 may be attached onto the inner surface of panel 31 near its lower edge 58 to mate with fasteners 61 (see FIGS. 1 and 2) provided on car 7.

Although the figures, thus far, have illustrated only enclosure-panel 31 as it is designed for use on the driver's-side of the cart, the invention also contemplates enclosure-panels for the passenger side (which are a mirror images of the driver's-side panel) and for the rear side of the cart. FIG. 6, an enlarged elevation view, illustrates rear-opening back enclosure panel 80. Back panel 80 is made to protect both the passengers of the vehicle and whatever cargo may be in the boot, or similar cargo holding space, from the elements. To do this, the major portion of back panel 80 is designed to be transparent, water and wind proof panel 88. Transparent panel 88 is sized and shaped to enclose the entire back side of the vehicle and provides for the panel to wrap about the back corners of the seat or boot of the vehicle by providing for open spaces 0 on each bottom corner of transparent panel 88. Extending nearly the entire length of each side of transparent panel 88 are opaque side flaps 82 that provide for secure coverage of the otherwise open corner space. A zipper attachment 84 is provided along nearly the entire length of side flap 82D and side flap 82P. Zipper attachments 84D and 84P provide for the attachment of side flap 82D and side flap 82P to the driver's-side panel and the passenger's side panel, respectively to securely enclose the rear interior of the vehicle. Each side flap 82D and side flap 82P extends from approximately top edge 4 of transparent panel 88 past bottom edge 3 of transparent panel 88 to bottom edge 6 of each one side flaps 82D and 82P, thus creating inner-oriented extension flaps 82P and 82D to extend toward each other. Extension flaps 82P and 82D are fitted with hook and loop attachment tabs 5D and 5P. Extension flap 82D is fitted with hook and loop attachment tabs 5D on the side of the material facing toward the vehicle. Extension flap 82P is fitted with hook and loop attachment tabs 5P on the side of the material that faces away from the vehicle. Extension flap 82P is fitted with only one vertical strip of hook and loop attachment tabs 5P while extension flap 82D is fitted with two spaced vertical strips of hook and loop attachment tabs 5D. This provides for extension flap 82P to be attached to extension flap 82D at either of its two strips providing for either a looser or tighter fit of panel 80 about the back of the vehicle. To retract, that is, to roll-up, back panel 80, extension flaps 82D and 82P are detached from the driver's-side panel and the passenger's side panel, respectively. Once back panel 80 is detached, extension flaps 82D and 82P are folded toward each other, that is, are folded up against portion 88 of back panel 80 along fold-lines 86D and 86P, respectively. To keep extension flaps 82D and 82P folded securely for roll-up, hook and loop attachments 5 are provided on the upper edge of panel 80 and on extension flaps 82D and 82P, as discussed above. Once secured in its folded position, the back panel is sized and ready to be retracted about rotable spindle 90 that may be mechanized and/or motorized.

The brackets 34, illustrated in FIG. 3A and FIG. 3B will now be described in further detail. As mentioned, each style of open-air car has custom designed roof supports and roof, and as also mentioned above, some car users replace the roof that came with the car by a specialty designed roof. Thus, each car requires brackets that conform to its roof and roof-support structure. Such custom designed brackets have been provided for in examples of the present invention, but are not so limited. Depending on the style of the car, the brackets may be installed on the vertically oriented stanchions of the roof frame or onto horizontally oriented roof supports. Examples of custom designed brackets are illustrated in FIGS. 7a-7E, FIGS. 8a-8c, FIGS. 9a-9c, FIGS. 10a-10c, and FIGS. 11A and 11b, as outlined in Table 1 below. Note that the brackets are designed to minimize the machining required to manufacture the brackets. One way the bracket design saves on material and manufacturing cost is to have rear brackets for each of the driver's and passenger's side panels also serve as brackets for the rear panel, thus requiring only four brackets for three panels. Another way the bracket design saves on material and manufacturing cost is to use the same front bracket for both the driver's side and the passenger's side. A bracket for one side of the cart is shaped by bending the bracket in one direction (using the bend lines as described above) and for use on the other side of the car the bracket is turned to its second side for the bending/shaping process. This saves tremendous amounts of time and materials and dye costs in the manufacture of the brackets.

TABLE 1

Figure 7E:
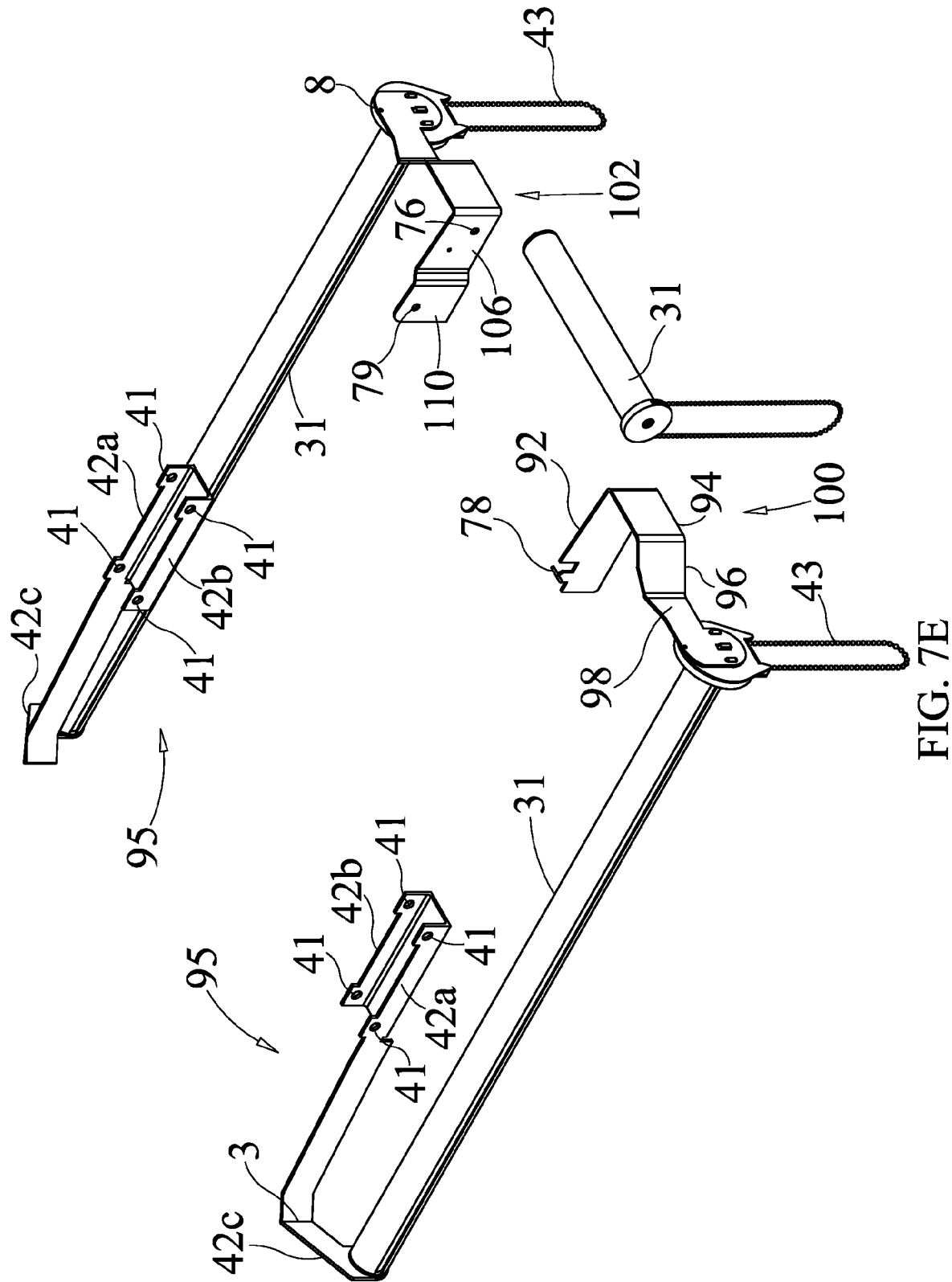
FIG. 7E is a perspective view of a set of brackets, as shown in FIG. 7a-7c, positioned as if installed with three enclosure panels in place.
Figure 9B:
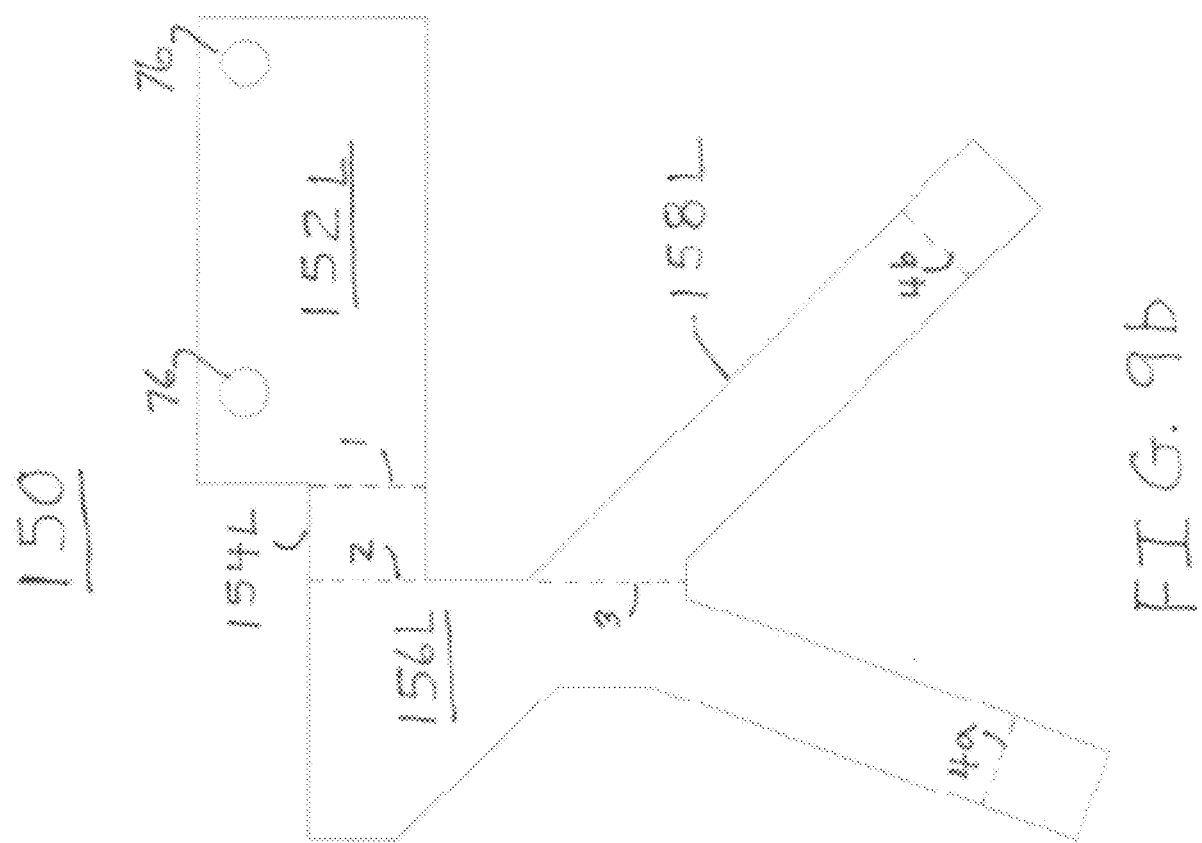
Figure 10C:
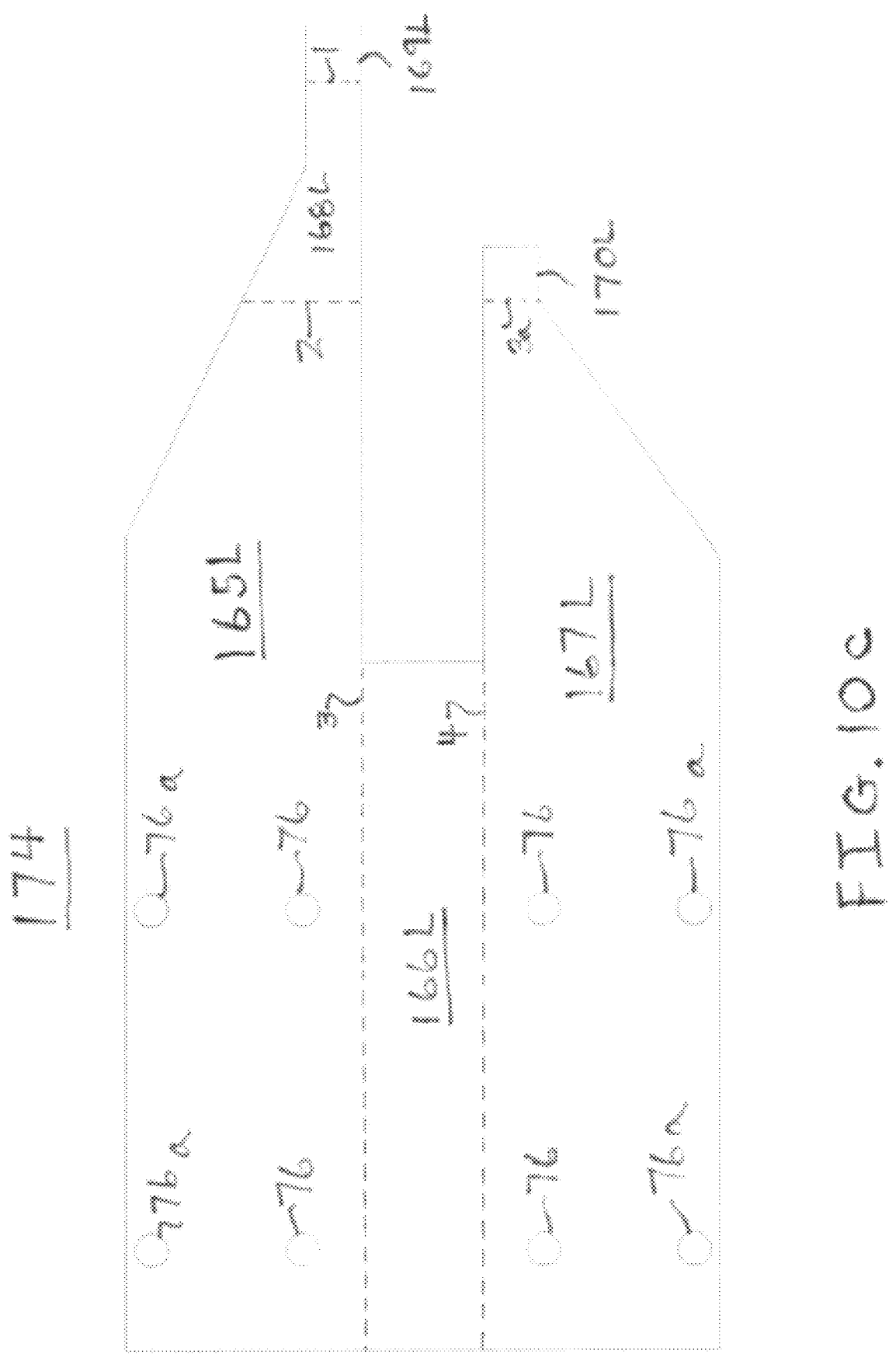
Figure 10D:
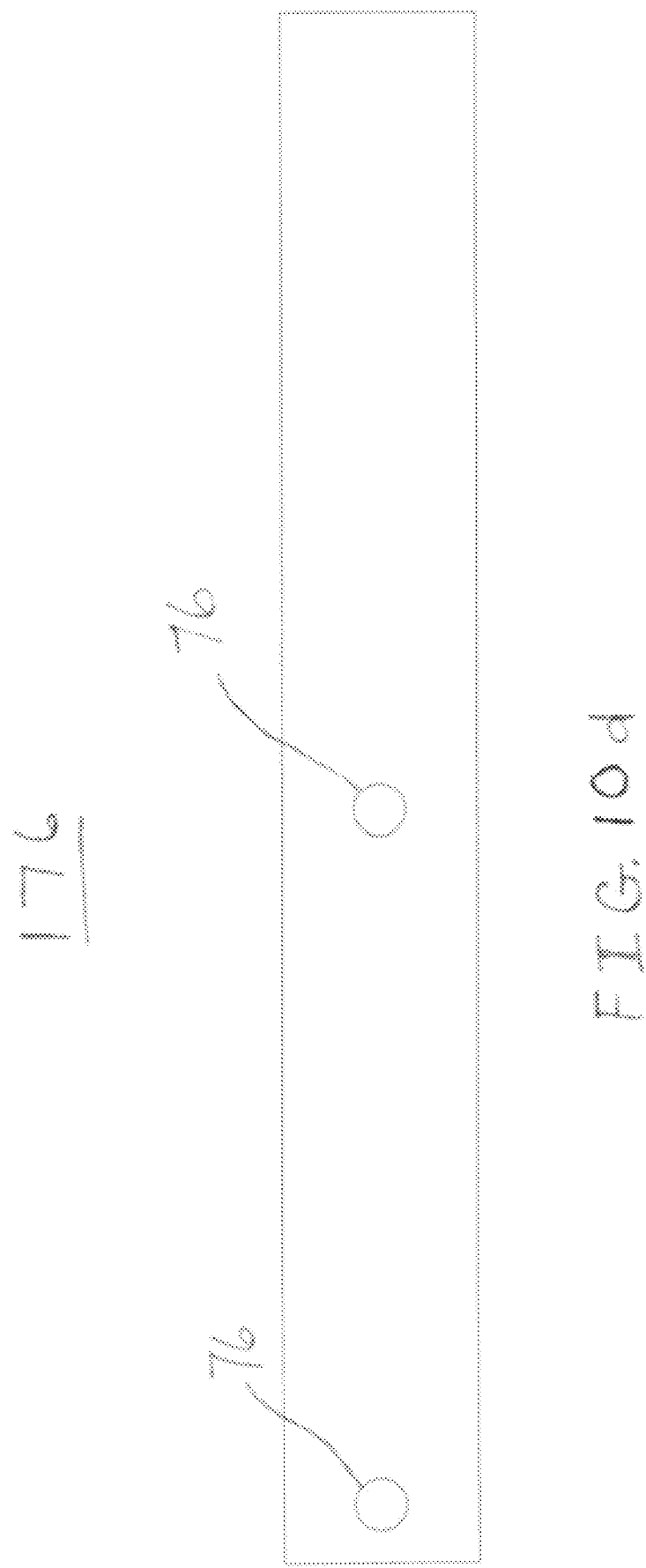
Figure 11A:
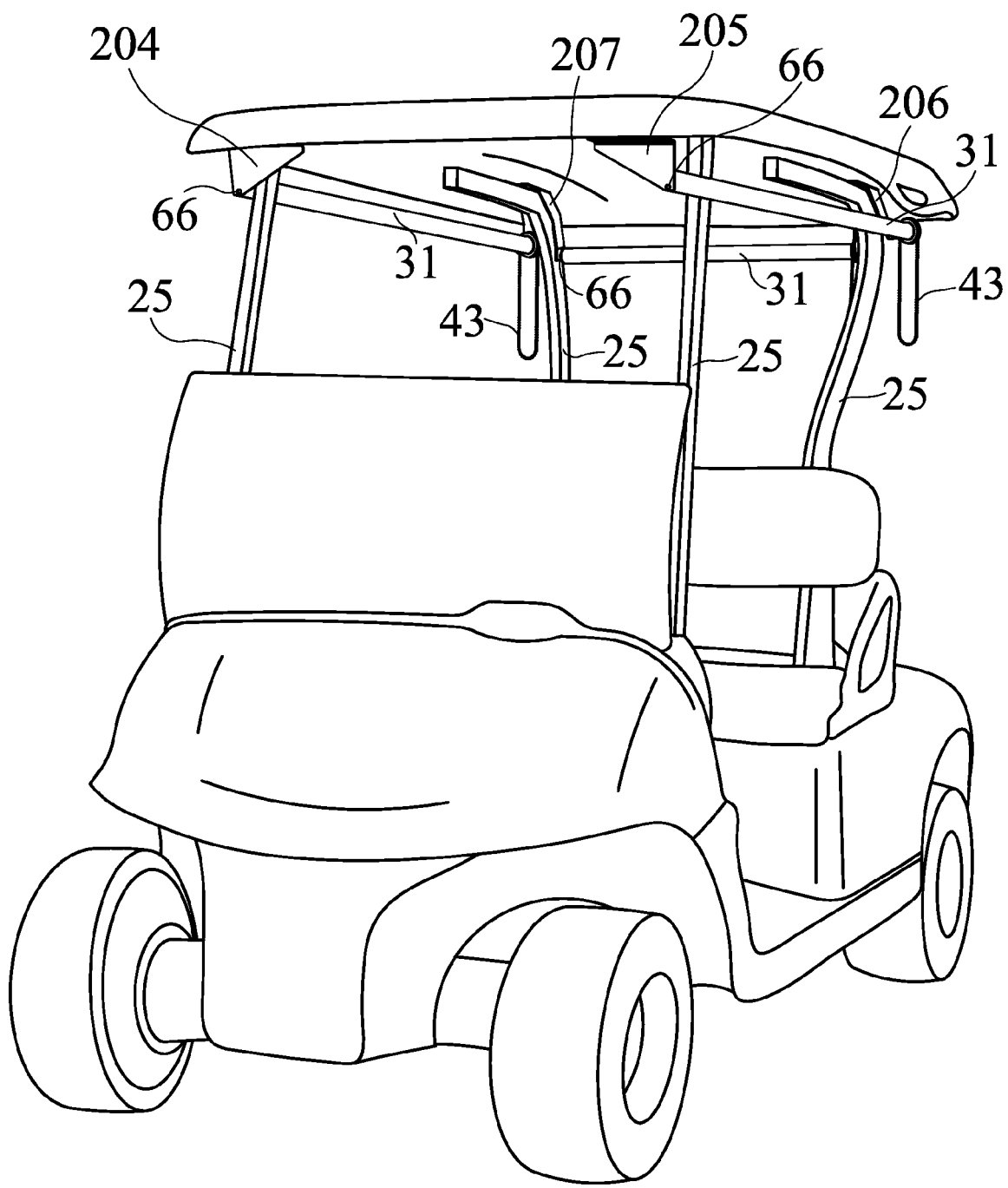
FIG. 11A is a perspective view of a set of brackets installed in an EZ-Go cart with three enclosure panels in place.
Figure 11B:
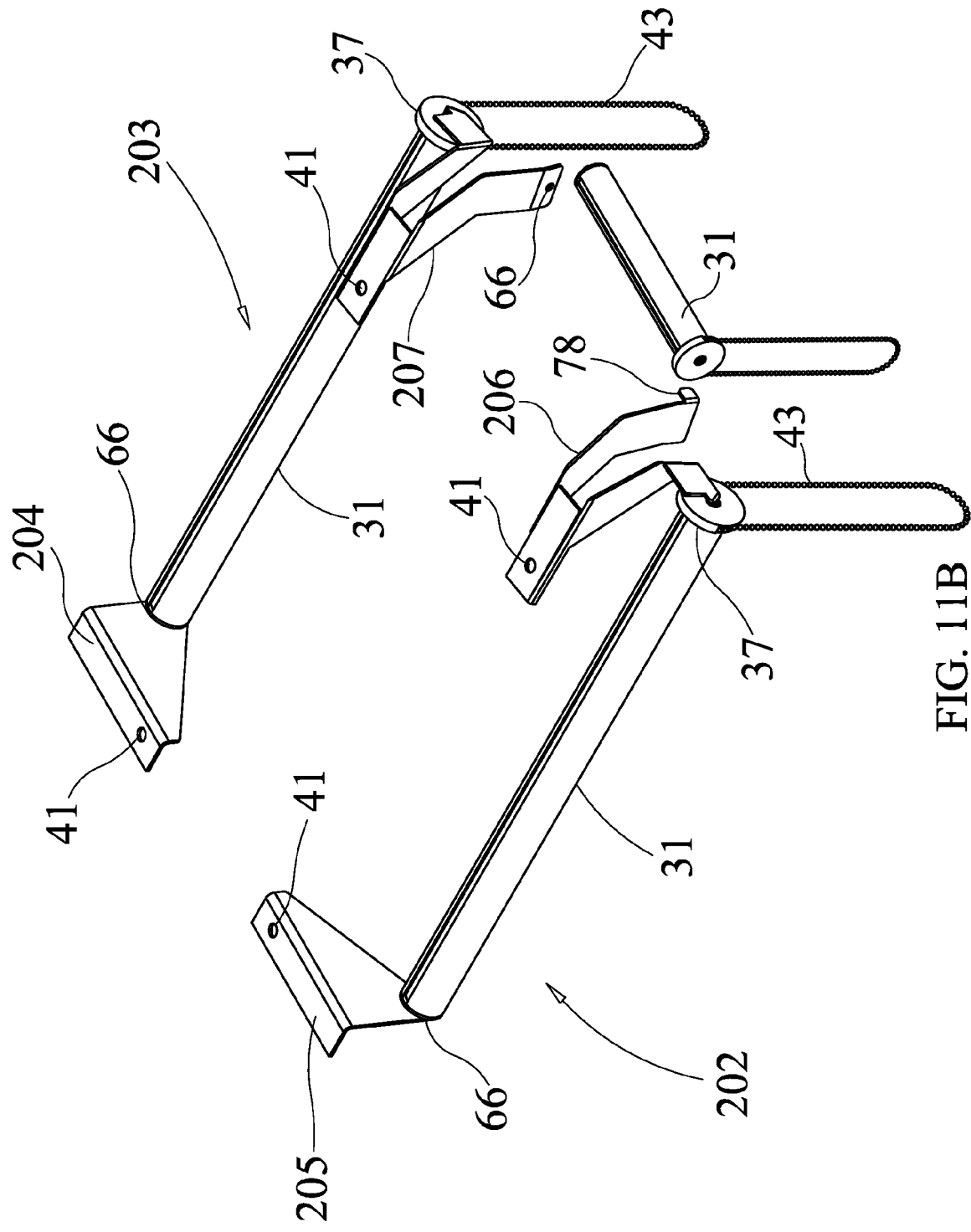
FIG. 11B is a perspective view of a set of brackets, as shown installed in FIG. 11A.
Figure 12:
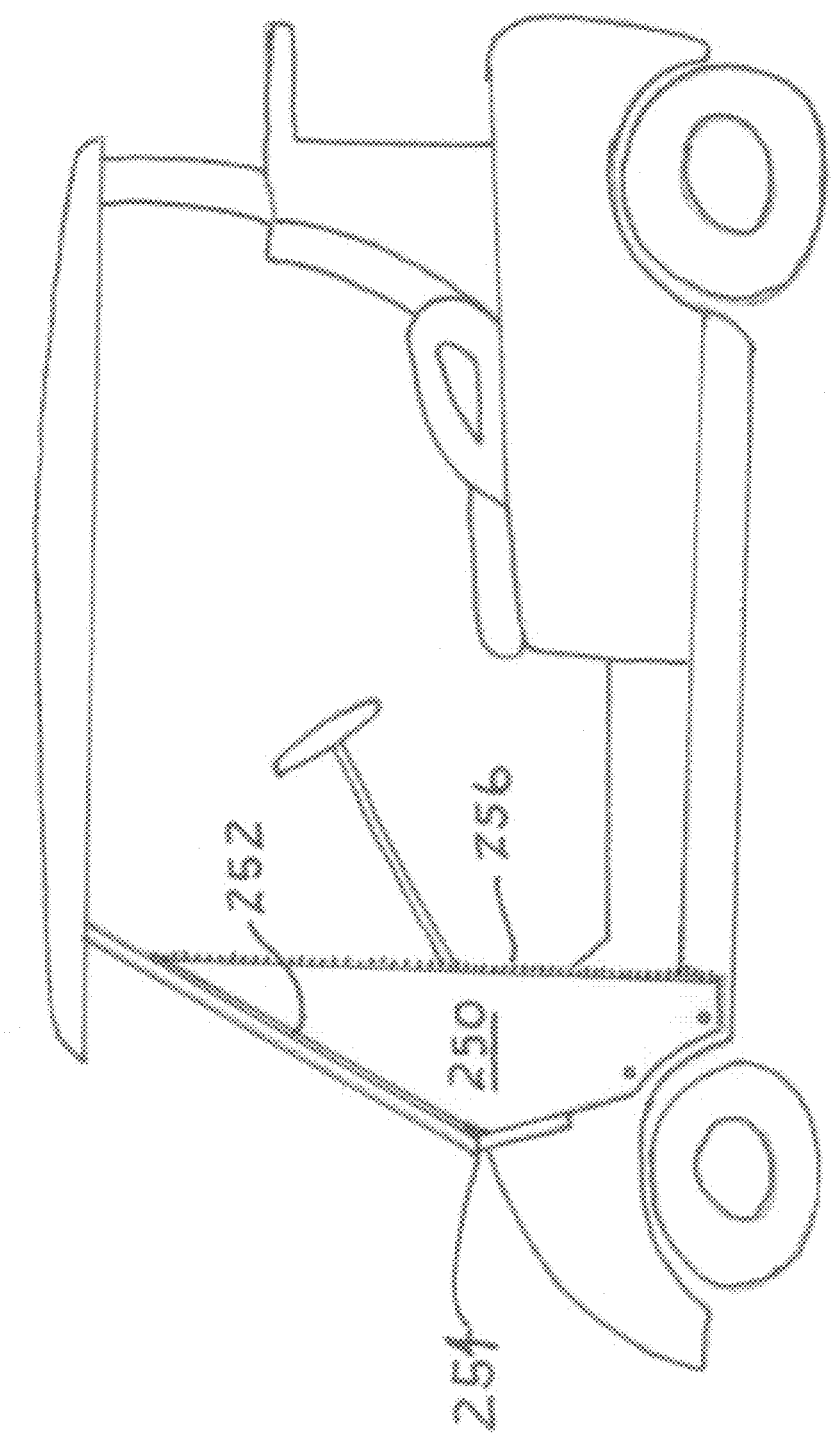
FIG. 12 is a perspective view of a cart having a vent panel.

| Club Car Precedent 2 Seater | | Club Car DS 4 Seater with "Custom Golf Car Supply" Roof with Track system. | |
|---|---|---|---|
| FIG. 7a | Front left (driver) & right (passenger) | FIG. 8a | Front left (driver) & right (passenger) |
| FIG. 7b | Drivers Rear | FIG. 8b | Drivers Rear |
| FIG. 7c | Passenger Rear | FIG. 8c | Passenger Rear |
| FIG. 7D | Cart with brackets installed | | |
| FIG. 7E | Brackets | | |
| Club Car Precedent 4 Seater with "Custom Golf Car Supply" Roof with Track system. | | Club Car DS 2 Seater | |
| FIG. 9a | Front | FIG. 10a | Front left and right |
| FIG. 9b | Drivers Rear | FIG. 10b | Passenger Rear |
| FIG. 9c | Passenger Rear | FIG. 10c | Drivers Rear |
| | | FIG. 10d | Brace |
| EZ-Go 2 Seater with | | | |
| FIG. 11A | Cart with brackets installed | | |
| FIG. 11B | Brackets | | |

FIG. 7a-7c, plan views, illustrate brackets designed to fit Club Car's Precedent which is a two-seater golf car. Although the examples provided herein name only four specific models and sizes, it is to be understood that the invention includes panels, spindles, and brackets that fit and work with all models and sizes of open-air cars including E-Z-GO, Yamaha, STAR Car, Columbia Par Car, and Tomberlin, for example.

Two of the bracket illustrated in FIG. 7a will, after shaping, support both the driver's-side front left panel and the passenger's side front right of a panel. To connect the bracket to the horizontal part of the roof stanchion oriented parallel to the long axis of the car on the driver's-side, bracket parts 42a and 42b of a first bracket are folded up along fold line 2 and fold line 1 so that the front side of the bracket parts (the side that are seen on the drawing) are folded toward each other, respectively and are then ready to be position about the roof stanchion. After removing the bolts that are securing the cart's roof to its support, the folded brackets are positioned so that bracket attachment bolt apertures 41 are aligned with the bolt holes of the roof supports. Bolts are then bolted through bolt receiving apertures 41 into the bolt openings of the stanchion. Bracket part 42c has been folded in the opposite direction to position spring roller receiving aperture 66 for accepting the spring roller end of the spindle of the driver's side panel. To date, all of the brackets are designed so that the spring roller end of the spindle is held in the aperture that is located at the front end of the car. To connect second bracket to the horizontal part of the roof stanchion on the passenger's side of the car oriented parallel to the long axis of the car, bracket parts 42a and 42b are folded up along fold line 2 and fold line 1 so that the back side of the bracket parts (the side that does not show on the drawing) are folded toward each other, respectively and are then ready to be position about the roof stanchion. After removing the bolts that are securing the cart's roof to its support, the folded brackets are positioned so that bracket attachment bolt apertures 41 are aligned with the bolt holes of the roof supports. Bolts are then bolted through bolt receiving apertures 41 into the bolt openings of the stanchion roof support. Second bracket part 42c, after having been folded in the opposite direction, is ready to support the spring roller end of the spindle of the passenger's side panel in spring roller receiving aperture 66. There are two brackets for installation onto the rear end of the roof stanchion. FIG. 7b illustrates the left rear, or the driver's-side, bracket and FIG. 7c illustrates the right rear, or the passenger's side bracket. These brackets provide the attachment mechanisms for both spindle rotating control ends of the side panels and both ends of the back panel. Bracket 100, custom designed for the left rear, or the driver's-side of Club Car's Precedent two seater, is shaped for use by bending bracket part 94 along fold line 3 ninety degrees towards bracket part 92, bracket part 96 is then bent along fold line 2 toward bracket part 92 about forty-five degrees, and finally bracket part 98 is bent about forty-five degrees along fold line 1 away from bracket part 92. Tab 78 must then be folded along fold line 9 ninety degrees in the direction of outside the drawing page. Bracket 100 is now shaped so that bolt hole 76 can be positioned on the roof support stanchion on the driver's-side of the car ready to support the chain end of spindle 40 of the driver's-side panel in the lock tab apertures 12, 14, 12, and tab 78 is positioned to support the driver's-side chain end of the spindle of the back panel. Threaded aperture 8 receives a set screw (not shown) to lock the mechanism to the bracket. FIG. 7c illustrates the right rear, or the passenger's side bracket 102. Bracket 102 is folded in an analogous manner to bracket 100 so that the two brackets are mirror images of each other except for two small, but important differences. Bracket 102 has two additional folds of about forty-five degrees in opposite directions along fold lines 3a and 3b so that sections 106 and 110 are made parallel to each other, but separated a distance of the width of section 108. The fold of about forty-five degrees starts by folding section 108 away from section 104. Bracket 102 is now shaped so that bolt hole 76 can be positioned on the roof support stanchion on the passenger's side of the car ready to support the chain end of spindle 40 of the passenger's side panel in the lock tab apertures 12, 14, 12, and aperture 79 is positioned to support the passenger's side, chain end of the spindle of the back panel. Threaded aperture 8 receives a set screw (not shown) to lock the mechanism to the bracket.

FIG. 7D, a perspective view, illustrates a set of brackets installed in a two-seater Club Car Precedent golf car with driver's side, passenger's side, and rear enclosure panels 31 in place. The 2-Seater Precedent comes with a roof and roof support stanchions. There are two front roof supports 25 and two rear roof supports 25. Following the principles of the inventive concept, the brackets that support the protective panels, are bolted directly to these roof supports using the same bolt apertures that bolt the roof to the roof support. To install the brackets, the existing bolts that are holding the roof to the roof support stanchions are removed, the brackets are positioned about the stanchion so that the bolt holes of the bracket are aligned with the preexisting bolt holes of the stanchion and the bolts are replaced. This installation takes from 10 to 20 minutes. No alteration of the cart is required to mount the brackets. If desired, instead of replacing the bolts that were removed, slightly longer bolts may be used to take into account the thickness of the brackets.

FIG. 7E, a perspective view, illustrates a set of brackets to hold enclosure panels on a two-seater Club Car Precedent golf car, as shown in FIG. 7D. As explained above, there are four separate brackets required to install three enclosure panels, a driver's side, a passenger's side, and a rear panel. The bracket set required for the installation of a protective panel on the driver's side consists of front bracket 95 and rear bracket 100. The two brackets that support a protective panel on the passenger side consists of a second front bracket 95 and rear bracket 102. Rear brackets 100 and 102 also provide the installation mechanisms 78 and 79 in bracket part 92 and 110, respectively, to support the spindle part of a rear protective panel. Rear bracket sections 106 and 92 each have an aperture 76 that is used to bolt the rear brackets to the preexisting bolt holes in the rear roof support stanchions. Front brackets 95 are all cut from the same die with one side used for the driver's side and the reverse side used for the passenger's side. Each front bracket 95 has an end with bracket parts 42*a* and 42*b* that are structured to be bolted to each of the front roof supports and an end 42*c* with aperture 66 for receiving the spring end of a protective enclosure panel spindle part. Rear driver's side brackets 100 and 102 each include two apertures 12 and one aperture 14 for directly supporting the second end of the driver's side protective panel. Details of how front brackets 95 are folded so as to be installed on one side of the cart or the other are discussed above, in relation to FIG. 7a.

FIG. 8*a*-8*c*, plan views, illustrate the brackets designed to fit a Club Car DS with a rear seat kit and a Custom Golf Car Supply roof. Currently all four seaters for which brackets are currently available have had the original roof of the car replaced by a long-top roof, made by Custom Golf Car Supply. This roof is unique in that it is supported on a track system, and, thus, the brackets for this car are designed to be attached to the tracks of the track system. Bracket 120, as illustrated in FIG. 8*a*, is designed to be used on both the front left (that is, the driver's-side) and the front right (the passenger's side). To connect the bracket to the horizontal part of the roof stanchion on the driver's-side oriented parallel to the long axis of the car, bracket section 126 is bent less than ninety degrees along fold line 2 towards the back facing surface of bracket section 125 (the face of the bracket that we cannot see on the drawing) and then bracket section 127 is bent less than ninety degrees along fold line 1 so that the section 127 of the bracket is spaced from and parallel to section 125 with section 126 between them. Bracket 120 is then ready to be bolted onto the front rail of the driver's-side. Bolts are then bolted through bolt receiving apertures 76 and into the bolt openings made into the double groove track system in the rail system where one groove holds the valance. A second bracket 120 is then shaped in an analogous manner to produce a mirror image of the first bracket 120. Once the second bracket 120 is bolted to the track system, the pair of brackets 120 (first and second bracket 120) are ready to support the spring end of each of the spindles of the opposing side panels in opposing receiving apertures 66. FIG. 8*b* illustrates bracket 122 for the left rear (the driver's-side rear-end) and FIG. 8*c* illustrates bracket 124 for the right rear (the passenger's side rear-end). These brackets provide the attachment mechanisms for both the rear (or chain mechanism) ends of the side panels and the back panel. Bracket 122, was devised for use on the left rear, or the driver's-side of Custom Golf Car Supply's roof that they designed for the DS four seater, and is shaped (folded) for use by bending bracket part 132L along fold line 1 about forty-five degrees towards the front of (the side facing the viewer of the page) bracket part 130L, bracket part 134L is then bent back along fold line 2 so as to be brought to be parallel to, but spaced from 130. Bracket part 136L is then bent about along fold line 3 to extend under and behind 130 and so that its face is at a about a ninety degrees angle from the face of bracket part 134L. Tabs 137*a* and 137*b* are then bent upwards along fold lines 4*a* and 4*b*. Bracket 122 is now shaped so that bolt holes 76 can be positioned and bolted onto the part of the track system located at the rear end of the driver's-side of the car to support the chain mechanism end of spindle 40 of the driver's-side panel using lock tab 137*b* to support the driver's-side chain end of the spindle of the driver's-side side-panel and lock tab 137*a* to support the back-side panel's chain end of its spindle. FIG. 8*c* illustrates the right rear, or the passenger's side bracket 124. Bracket 124 is folded in a nearly mirror image manner to bracket 122, with one difference. Instead of having two legs both ending with lock tabs (such as lock tabs 137*a* and 137*b* of bracket 122), bracket 124 has one lock tab 137*a* leg and one wider leg 134 having receiving aperture 66. Once bracket 124 is bolted onto that part of the track system located at the rear end of the passenger's-side of the car using bolt holes 76, lock tab 137*a* is positioned to support the chain mechanism end of the spindle of the passenger's-side panel and receiving aperture 66 is positioned to support the back-side panel's spring-action end of its spindle.

FIG. 9*a*-9*c* are plan views of brackets designed to fit a Club Car Precedent cart that has a rear seat kit with a Custom Golf Car Supply roof. Currently, as mentioned above, all four seaters for which brackets are currently available have had the original roof of the car replaced by a four-seater roof, made by "Custom Golf Car Supply", that is supported on a track system, and, thus, the brackets for this car are designed to be attached to the tracks of the track system. Bracket 140, as illustrated in FIG. 9*a*, is designed to be used on both the front left (that is, the driver's-side) and the front right (the passenger's side). To connect the bracket to the horizontal part of the roof stanchion on the driver's-side oriented parallel to the long axis of the car, bracket section 144 is bent less than ninety degrees along fold line 1 towards the back facing surface of bracket section 142 (the face of the bracket that we cannot see on the drawing) and then bracket section 146 is bent less than ninety degrees along fold line 2 so that section 142 of the bracket is spaced from and parallel to section 146 with section 144 between them. Bracket 140 is then ready to be bolted onto the rails of the driver's-side. Bolts are then bolted through bolt receiving apertures 76 and into the bolt openings of the track system in the rail system that holds the valence. A second bracket 140 is then shaped in an analogous manner to produce a mirror image of the first bracket 140. Once the second bracket 140 is bolted to the track system, the pair of brackets 140 (first and second bracket 120) are ready to support the spring end of each of the spindles of the opposing side panels in opposing receiving apertures 66. FIG. 9*b* illustrates bracket 150 for the left rear (the driver's-side rear-end) and FIG. 9*c* illustrates bracket 155 for the right rear (the passenger's side rear-end). These brackets, which are identical to the brackets illustrated in FIGS. 9*b* and 9*c*, provide the attachment mechanisms for both the rear (or chain mechanism) ends of the side panels and the chain mechanism end and the spring action end of the back panel's spindle.

FIG. 10*a*-10*d* are plan views of brackets designed to fit a Club Car DS two-seater. The bracket illustrated in FIG. 10*a* is designed to be used on both the front left (that is, the driver's-side) and the front right (the passenger's side). To connect the bracket to the horizontal part of the roof stanchion on the driver's-side oriented parallel to the long axis of the car, bracket parts 161 and 162 are each bent along fold line towards their back sides (the sides that are not able to be seen on the drawing) to be ready to be position about the roof stanchion. Bolts are then bolted through bolt receiving apertures 76 and 76 into the stanchion. Spring roller receiving aperture 66 is thus positioned for accepting the spring roller end of the spindle of the driver's side panel. To date, as mentioned above, all of the brackets are designed so that the spring roller end of the spindle is held in the aperture that is located at the front end of the car. To connect a second bracket to the horizontal part of the roof stanchion on the passenger's side of the car oriented parallel to the long axis of the car, bracket parts 161 and 162 are each bent along fold line towards their front sides (the sides that are able to be seen on the drawing) to be ready to be position about the roof stanchion. Bolts are then bolted through bolt receiving apertures into the bolt openings of the stanchion. FIG. 10*b* illustrates the right rear, or the passenger's side bracket 164. Section 165R and section 167R of bracket 164 are bent up towards each other along fold lines 3 and 4, respectively so that the two faces of section 165R and section 167R that we can see on the drawing are facing each other to form a "U" shape with section 166R forming the bottom of the "U". The height of these two brackets is greater than that of the other brackets so that there are two additional bolt holes for supporting the bracket. Bolt apertures 76*a* then can be bolted directly to the folded-down edge of the roof and bolt apertures 76 can be bolted to the roof supporting stanchions. Section 168R must then be bent along fold line 2 away from section 165R at an angle of about ninety degrees and section 169R must be bent along fold line 1 back toward section 165 also at an angle of about ninety degrees, Bracket 164 is now shaped so that once bolted, as described above, aperture 66 is in position to support the spring-mechanism end of the back panel's spindle and tab 169R is positioned to provide support for the passenger's side chain end of the spindle of the side panel by being inserted into the slot provided on the spindle for that purpose. FIG. 10*c* illustrates the left rear, or the driver's-side, bracket. Bracket 174, is bent along fold lines 3 and 4 in a nearly mirror image manner to bracket 164, with one difference. Instead of having one working end having a receiving aperture 66 while the other working end has a tab connection, both working ends 169L and 170L provide tab connectors. Once bolted, as described above, tab 170L is positioned to support the chain mechanism end of the spindle of the back-panel and tab 169L is positioned to support the chain mechanism end of the spindle of the driver's side. Brace 176, as illustrated in FIG. 10*d*, is a brace to provide support for bracket 160 to prevent it from bending in toward the vehicle's interior.

FIG. 11A, perspective view, illustrates an EZ-Go cart equipped with a set of brackets according to the principles of the present invention supporting a driver's side, passenger's side, and rear enclosure panel 31. The EZ-Go cart is usually offered with a roof and roof support stanchions. There are two front roof supports 25 and two rear roof supports 25. The brackets of the inventive concept that support the protective panels are bolted directly to the roof supports using the same bolt apertures that bolt the roof to the roof support. To install the brackets, the existing bolts that are holding the roof to the roof support stanchions are removed, the brackets are positioned over the stanchion so that the bolt holes of the bracket are aligned with the preexisting bolt holes of the stanchion and the bolts are replaced. This installation takes from 10 to 20 minutes. No alteration of the cart is required to mount the brackets. If desired, instead of replacing the bolts that were removed, slightly longer bolts may be used to take into account the thickness of the brackets.

FIG. 11B, a perspective view, illustrates a set of brackets for use on an EZ-Go golf car, as shown in FIG. 11A. There are four separate custom designed brackets to support driver's side, passenger's side, and rear enclosure panels. The bracket set required for the installation of a protective panel on the driver's side consists of front bracket 204 and rear bracket 206. The two brackets that support a protective panel on the passenger side consists of a second front bracket 205 and rear bracket 207. Rear brackets 205 and 207 also provide the installation mechanisms 78 and 66 to support a rear protective panel. Rear bracket sections 206 and 207 each have an aperture 41 that is used to bolt the rear brackets to the preexisting bolt holes in the rear roof support stanchions. To position brackets 206 and 207, the bolts securing the roof to the roof stanchions are removed, the roof is lifted, the brackets are slide over the stanchion and the bolts replaced. Each front bracket 204 and 205 has an aperture 41 for securing the bracket to the front panels and an aperture 66 (as shown on bracket 207) for receiving the spring end of a protective enclosure panel spindle.

The protective panels, following the inventive concept as taught herein, provide complete protection for the interior of the car on which they are installed. The panels all may be detachably attached to their immediately adjacent panel(s). The complete protection provided by the rear panel was discussed in detail above. The front of the car, from driver's side roof support to passenger's side roof support is protected from the elements by a front windshield that is usually provided on open air cars. So that the driver's and passenger's side protective panels may also provide complete enclosure for the car, that is, so that the open gap between the front edge of the driver's and passenger's side protective panels and the front roof supports can be completely closed, each of the front edges of the driver's and passenger's side protective panels is fitted with a connector, such as a zipper, to provide for each to be sealed to a vent panel that in turn is affixed to a front roof support. Each vent panel 250 is a small panel positioned to cover the gap that otherwise would be between the front roof supports 25 and the side panels. Each vent panel 250 is installed onto the cart using awning sleeve rails 252, also referred to as slide tracks. Each slide track 252 is fixedly attached to one of the two front roof supports 25. Each of the vent panels is fitted with a welt 254 on one of its two long sides. Each welt 254 slides easily into a slide track 252. On the other long side of each of the vent panels there is a connector, such as zipper 256, that provides for connection of each of the side panels to their adjacent vent panel, thus providing for the car to be completely enclosed and protected from the elements.

Thus, the inventive concept of providing brackets for supporting enclosure panels on open air cars that require no alteration to the car, only about 20 minutes installation time, and are attached to the pre-existing bolt holes that are used to bolt the car's roof to its roof supporting stanchions on has been shown. The brackets taught herein are installed on pre-existing roof supports (vertical or horizontal) using only the preexisting bolt holes in the roof supports and either the bolts that are used to fix the roof to the stanchions or the slightly elongated bolts that are part of the invention or they may be installed directly to the roof. Only 4 brackets are required to support three panels, the driver's side panel, the passenger's side, and the rear panel.

The foregoing description, for purposes of explanation, uses specific and defined nomenclature to provide a thorough understanding of the invention. However, it will be apparent to one skilled in the art that the specific details, such as attachment of the panels to roof supports are not required in order to practice the invention, that is, attachment of the panels may be made directly to the roof, for example. The foregoing description of the specific embodiment is presented for purposes of illustration and description and is not intended to be exhaustive or to limit the invention to the precise form disclosed. Those skilled in the art will recognize that many changes may be made to the features, embodiments, and methods of making the embodiments of the invention described herein without departing from the spirit and scope of the invention. Furthermore, the present invention is not limited to the described methods, embodiments, features or combinations of features but include all the variation, methods, modifications, and combinations of features within the scope of the appended claims. The claimed invention is limited only by the claims.

What is claimed is:

1. A set of brackets, comprising:
    a first front bracket directly securable to a driver's side front roof support of an open-air car and a first end of a spindle part of a driver's side protective panel directly supportable by said first front bracket;
    a second front bracket directly securable to a passenger's side front roof support of the open-air car and a first end of the spindle part of a passenger's side protective panel's directly supportable by said first front bracket;
    a first rear bracket directly securable to a driver's side back roof support of the open-air car and a second end of said spindle part of said driver's side protective panel and a first end of a spindle part of the rear panel directly supportable by said first rear bracket, and
    a second rear bracket directly securable to a passenger's side back roof support of the open-air car and a second end of said spindle part of said passenger's side protective panel and a second end of said spindle part of said rear panel directly supportable by said second rear bracket,
    said first and second front brackets and said first and second rear brackets each to be secured to one of said roof supports using only preexisting roof support bolt holes requiring no modification to the open-air car providing for only four brackets to support three protective panels.

2. The set of brackets, as recited in claim 1 wherein each of said front brackets are both from the same die.

3. The set of brackets, as recited in claim 2, wherein said first end of each of said spindle parts of said panels is the spring-action end and said second end of each of said spindle parts of said panels is a panel height-adjustment mechanism end.

4. The set of brackets, as recited in claim 1, wherein said first and second front brackets and said first and second rear brackets are custom shaped for securing to the roof supports of a 2-Seater Club Car Precedent Golf Cart.

5. The set of brackets, as recited in claim 4, wherein each bracket of said set of brackets are directly securable to the roof supports using receiving pre-existing roof support bolt holes, further comprising
    a first and a second front driver's side bracket 95 each having a front roof support attachment 42;
    a rear driver's side bracket 100 having a rear roof support attachment 76, and
    a rear passenger's side bracket 102 having a rear roof support attachment 76.

6. The set of brackets, as recited in claim 5, wherein each of said first and second front driver's side brackets 95 include an aperture 66 for directly supporting said first end of said spindle parts of said driver's side and said passenger's side protective panels.

7. The set of brackets, as recited in claim 6, wherein said rear driver's side bracket 100 includes apertures 12 and 14 for directly supporting said second end of said spindle part of said driver's side protective panel.

8. The set of brackets, as recited in claim 7, wherein said rear passenger's side bracket 102 includes apertures 12 and 14 for directly supporting said second end of said spindle part of said driver's side protective panel.

9. The set of brackets, as recited in claim 8, wherein said rear driver's side bracket 100 includes tabs 78 for directly supporting said second end of said spindle part of said rear protective panel and said rear passenger's side bracket 110 includes an aperture 79 for directly supporting said first end of said spindle part of said rear protective panel.

10. The set of brackets, as recited in claim 1, wherein said first and second front brackets and said first and second rear brackets are custom shaped for being securable to the roof supports of an EZ-Go Golf Cart.

11. The set of brackets, as recited in claim 10 wherein each bracket of said set of brackets are directly securable to the roof supports using receiving pre-existing receiving pre-existing roof support bolt holes, further comprising
    a first front driver's side bracket 204 having front roof support attachment 41;
    a second front passenger's side bracket 205 having front roof support attachment 41,
    a rear driver's side bracket 206 having rear roof support attachment 41,
    a rear passenger's side bracket 207 having rear roof support attachment 41.

12. The set of brackets, as recited in claim 11, wherein each of said first and second front brackets, 204 and 205, each include an aperture 66 for directly supporting said first end of said spindle parts of said driver's side and said passenger's side protective panels.

13. The set of brackets, as recited in claim 12, wherein said rear driver's side bracket 206 includes tabs 78 for directly supporting said second end of said spindle part of said driver's side protective panel.

14. The set of brackets, as recited in claim 12, wherein said rear driver's side bracket 206 includes tabs 78 for directly supporting said second end of said spindle part of said rear protective panel and said rear passenger's side bracket 207 includes an aperture 66 for directly supporting said first end of said spindle part of said rear protective panel.

15. Protective panels with supporting brackets for use in open-air cars, comprising:
- a first front bracket directly securable to a driver's side front roof support on an open-air car and a first end of a spindle part of a driver's side protective panel directly supported by said first front bracket;
- a second front bracket directly securable to a passenger's side front roof support of the open-air car and a first end of a spindle part of a passenger's side protective panel directly supported by said first front bracket;
- a first rear bracket directly securable to a driver's side back roof support of the open-air car and a second end of said spindle part of said driver's side protective panel and a first end of a spindle part of a rear panel directly supported by said first rear bracket, and
- a second rear bracket directly securable to a passenger's side back roof support of the open-air car and a second end of a spindle part of said passenger's side protective panel and a second end of said spindle part of said rear panel directly supported by said second rear bracket, said first and second front brackets and said first and second rear brackets each to be secured to one of said roof supports using only preexisting roof support bolt holes requiring no modification to the open-air car providing for only four brackets to support three protective panels.

16. The protective panels, as recited in claim 15, wherein only a single panel is required per side of open-air vehicle.

17. The set of brackets, as recited in claim 16, wherein each spindle of said panels is a rotatable spindle and said first end of each spindle is a spring-action end and each second end of each spindle is a panel height-adjustment mechanism end.

18. The set of brackets, as recited in claim 15, further include a driver's side vent panel 250 positioned between and connectable to the driver's side front roof support 25 and the driver's side protective panel and a passenger's side vent panel 250 positioned between and connectable to the passenger's side front roof support the passenger's side protective panel.

* * * * *